United States Patent
Lee et al.

(10) Patent No.: US 8,573,799 B2
(45) Date of Patent: Nov. 5, 2013

(54) LIGHTING DEVICE INCLUDING A PLURALITY OF LEDS ARRANGED THEREIN

(75) Inventors: Sang Hoon Lee, Seoul (KR); Hyun Ha Shin, Seoul (KR); Im Je Woo, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/293,390

(22) Filed: Nov. 10, 2011

(65) Prior Publication Data

US 2012/0051050 A1    Mar. 1, 2012

(30) Foreign Application Priority Data

Nov. 12, 2010 (KR) .................. 10-2010-0112975
Nov. 12, 2010 (KR) .................. 10-2010-0112976
Nov. 12, 2010 (KR) .................. 10-2010-0112977

(51) Int. Cl.
*F21V 21/00* (2006.01)
*F21V 5/00* (2006.01)
*F21V 15/00* (2006.01)

(52) U.S. Cl.
USPC ............. 362/217.12; 362/311.02; 362/365; 362/370

(58) Field of Classification Search
USPC ............. 362/217.12, 311.02, 365, 370
See application file for complete search history.

(56) References Cited

U.S. PATENT DOCUMENTS

| 8,459,824 | B1* | 6/2013 | Esmailzadeh et al. | ........ 362/147 |
| 2005/0201098 | A1* | 9/2005 | DiPenti et al. | ................ 362/294 |
| 2008/0158880 | A1* | 7/2008 | Ito | ................ 362/243 |
| 2010/0110683 | A1* | 5/2010 | Fang et al. | ............... 362/249.02 |
| 2010/0110699 | A1* | 5/2010 | Chou | ............................ 362/365 |
| 2010/0157610 | A1* | 6/2010 | Xiao et al. | .................... 362/370 |
| 2010/0214770 | A1 | 8/2010 | Anderson | .................... 362/133 |

FOREIGN PATENT DOCUMENTS

DE   20 2010 001 126 U1   4/2010
JP        2010-003683 A    1/2010

OTHER PUBLICATIONS

European Search Report dated Feb. 15, 2012 issued in Application No. 11 18 8644.

* cited by examiner

*Primary Examiner* — Anh Mai
*Assistant Examiner* — Michael Santonocito
(74) *Attorney, Agent, or Firm* — KED & Associates LLP

(57) ABSTRACT

A lighting device may be provided that includes a light emitter including a plurality of LEDs; a reflective plate disposed on the light emitter; a diffuser plate disposed in a direction in which light emitted from the LED is irradiated; a case including the light emitter disposed therein and including a bottom plate and a side wall extending from both side ends of the bottom plate; and a connecting member extending from the side wall of the case and including a bracket coupler on at least one side thereof. The light emitter is disposed between the bottom plate of the case and the diffuser plate.

20 Claims, 30 Drawing Sheets

LIGHTING DEVICE INCLUDING A PLURALITY OF LEDS ARRANGED THEREIN

CROSS-REFERENCE TO RELATED APPLICATION

This application claims priority under 35 U.S.C. §119 from Korean Application No. 10-2010-0112975, filed Nov. 12, 2010, No. 10-2010-0112976, filed Nov. 12, 2010 and No. 10-2010-0112977, filed Nov. 12, 2010, the subject matters of which are incorporated herein by reference.

BACKGROUND

1. Field

Embodiments may relate to a lighting device, and more particularly to an LED lighting device including a plurality of LEDs arranged therein.

2. Background

A light emitting diode (LED) is a semiconductor element for converting electric energy into light. An electric bulb has a short life span. A longer time for use of the electric bulb allows the life span to be shorter. For this reason, the electric bulb is required to check and change cyclically. Therefore, there has been a problem of paying for the additional cost of changing and managing the electric bulb. As compared with existing light sources such as a fluorescent lamp and an incandescent electric lamp and so on, the LED has advantages of low power consumption, a semi-permanent span of life, a rapid response speed, safety and an environment-friendliness. Therefore, the LED is used as a light source for lighting devices, for example, various lamps used interiorly and exteriorly, a liquid crystal display device, an electric sign and a street lamp and the like, as a result, is now increasingly taking the place of the electric bulb.

SUMMARY

One embodiment is a lighting device. The lighting device may include: a light emitter including a plurality of LEDs; a reflective plate disposed on the light emitter; a diffuser plate disposed in a direction in which light emitted from the LED is irradiated; a case including the light emitter disposed therein and including a bottom plate and a side wall extending from both side ends of the bottom plate; and a connecting member extending from the side wall of the case and including a bracket coupler on at least one side thereof. The light emitter may be disposed between the bottom plate of the case and the diffuser plate.

Another embodiment is a lighting device. The lighting device may include: a light emitter including a plurality of LEDs; a reflective plate being disposed on the light emitter and including a bottom reflective plate and a side reflective plate which extends from the bottom reflective plate and includes an inclination; a diffuser plate disposed in a direction in which light emitted from the LED is irradiated; a case including the light emitter disposed therein and including a bottom plate and a side wall extending from both side ends of the bottom plate; and a connecting member extending from the side wall of the case and including a bracket coupler on at least one side thereof.

Further another embodiment is a lighting device. The lighting device may include: a light emitter including a plurality of LEDs; a reflective plate disposed on the light emitter; a diffuser plate being disposed in a direction in which light emitted from the LED is irradiated and including a locking part; a case including the light emitter disposed therein and including a bottom plate and a side wall extending from both side ends of the bottom plate; and a connecting member extending from the side wall of the case and including a bracket coupler on at least one side thereof. At least one of the reflective plate or the case may include a fastener fastened to the locking part of the diffuser plate.

The lighting device according to the embodiment may further include a heat radiator contacting with the light emitter.

The heat radiator may include at least one of a heat radiating fin or a heat radiating sheet.

The light emitter may be disposed closer to the diffuser plate than the bottom plate of the case.

The connection member may include a louver or a top plate. The bracket coupler may be disposed at the end of the louver or the top plate.

The louver or the top plate may be inclined more outward than the side wall.

The side wall of the case may include a first side wall and a second side wall opposite to the first side wall. The connection member may include a first connector extending from the first side wall and a second connector extending from the second side wall. At least one of the first connector or the second connector may include the bracket coupler.

The diffuser plate may include at least one paraboloid which is convex in a traveling direction of the light emitted from the light emitter.

The diffuser plate may include a flat incident surface of the light emitted from the light emitter and a convex emitting surface of the light emitted from the light emitter.

The reflective plate may include a bottom reflective plate and a side reflective plate extending from the bottom reflective plate and having an inclination.

The reflective plate may further include a fixing protrusion extending from the side reflective plate. The case may further include a coupling recess coupled to the fixing protrusion.

The side reflective plate of the reflective plate may have a first inclination. The reflective plate may further include an auxiliary reflective plate extending from the side reflective plate and having a second inclination. The first inclination may be different from the second inclination.

The reflective plate may further include a fixing protrusion extending from the auxiliary reflective plate. The case may further include a coupling recess coupled to the fixing protrusion.

The diffuser plate may include a locking part. At least one of the reflective plate or the case may include a fastener fastened to the locking part.

The reflective plate may include the fastener. The case may further include a coupling recess into which an end of the reflective plate is inserted. The fastener of the reflective plate may be disposed closer to the light emitter than the end of the reflective plate.

The locking part of the diffuser plate may include at least one of a locking projection or a locking hole.

BRIEF DESCRIPTION OF THE DRAWINGS

Arrangements and embodiments may be described in detail with reference to the following drawings in which like reference numerals refer to like elements and wherein:

FIG. 42 is a cross sectional view of the support frame 50;

DETAILED DESCRIPTION

Figure 1A:
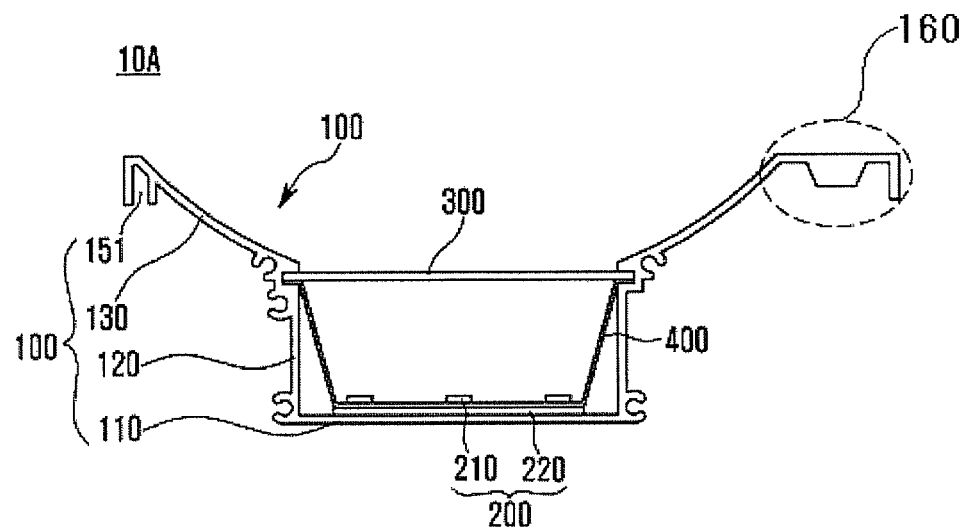
FIGS. 1a to 1d are cross sectional views of a first single lighting module 10A.

Hereafter, an embodiment will be described in detail with reference to the accompanying drawings. However, it can be easily understood by those skilled in the art that the accompanying drawings are described only for easily disclosing the contents of the present invention and the scope of the present invention is not limited to those of the accompanying drawings.

A criterion for "on" and "under" of each layer will be described based on the drawings. A thickness or a size of each layer may be magnified, omitted or schematically shown for the purpose of convenience and clearness of description. The size of each element may not necessarily mean its actual size.

In description of embodiments, if there is no particular criterion for an upper surface and a lower surface of each component layer, drawings are regarded as the criterion. Here, on the basis of the drawings, it is generally assumed that a surface on which a bottom plate of a case is located is a lower surface, and a surface on which a diffuser plate is located is an upper surface. However, in FIGS. 7, 13, 19 and 41, it is assumed that a surface on which a bottom plate of a case is located is an upper surface, and a surface on which a diffuser plate is located is a lower surface. The top and bottom of each component layer will be described on the basis of the drawings. A thickness or size of each component is magnified, omitted or schematically shown for the purpose of convenience of description and clearness. The size of each component does not necessarily mean its actual size. In the case where a reference numeral is not added to a term of "a lighting device", it means that the lighting device includes lighting devices 1A, 1B, 1C, 1D, 1E and 1F according to a first to a sixth embodiment.

It will be understood that when an element is referred to as being 'on' or "under" another element, it can be directly on/under the element, and one or more intervening elements may also be present. When an element is referred to as being 'on' or 'under', 'under the element' as well as 'on the element' can be included based on the element.

Further, throughout the specification, when it is mentioned that a portion is "connected" to another portion, it includes not only "is directly connected" but also "electrically connected" with another element placed therebetween. Additionally, when it is mentioned that a portion "includes" an element, it means that the portion does not exclude but further includes other elements unless there is a special opposite mention.

Hereafter, a first single lighting module, a second single lighting module, a third single lighting module and lighting devices according to embodiments thereof will be described with reference to FIGS. 1a to 41.

Single Lighting Module

Unlike a usual lighting device, a lighting device 1 to be described in the following embodiments is formed in a particular manner. That is, the lighting device 1 is formed to include one single lighting module 10 and one power supply controller 20 or is formed to include a plurality of the single lighting modules 10 and at least one power supply controller 20. Since the lighting device 1 having various sizes is formed of one single lighting module 10 or is formed through combination of a plurality of the single lighting modules 10, a lighting device 1 having a desired size is not limited to be formed.

In the single lighting module 10, a first single lighting module 10A, a second single lighting module 10B and a third single lighting module 10C will be described. There may be also a single lighting module having another shape.

Figure 1B:
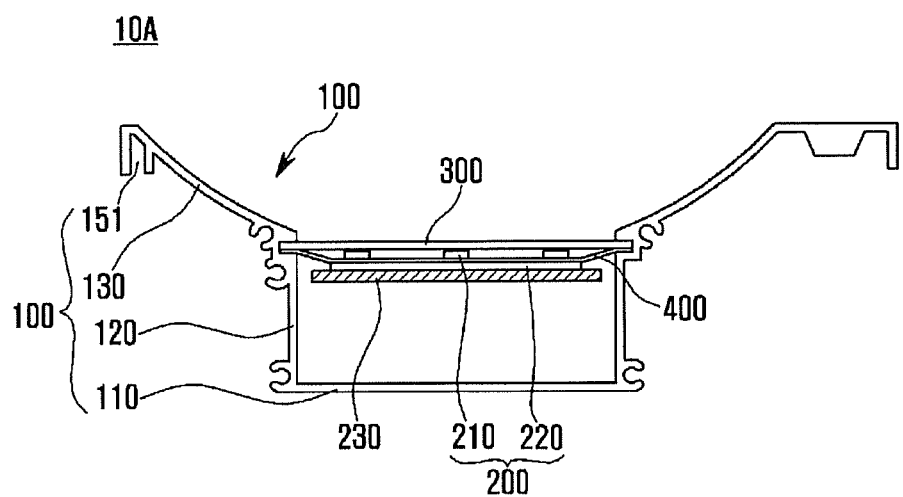
Figure 1C:
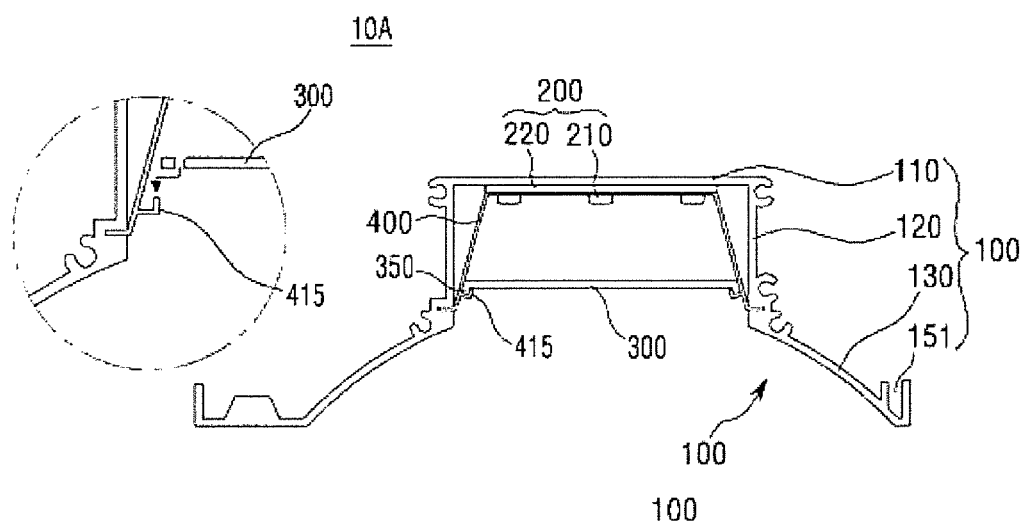
Figure 1D:
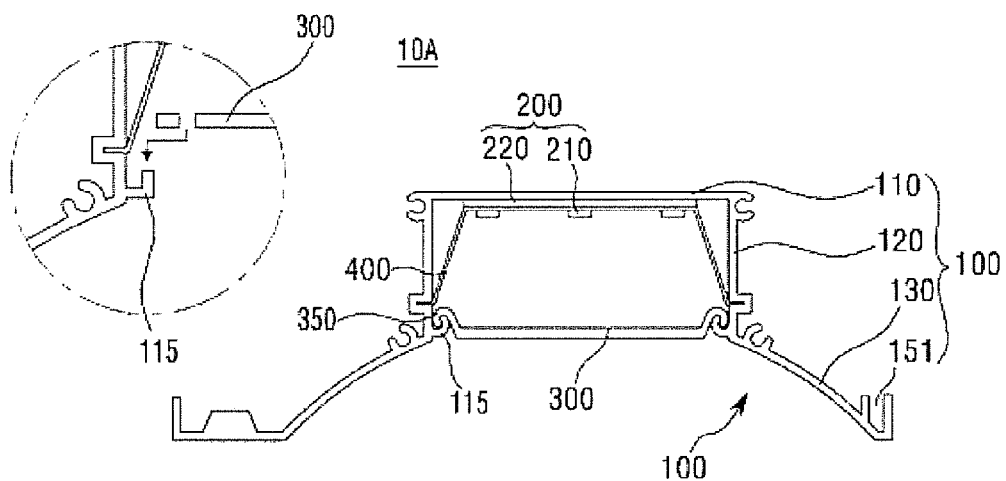
Figure 2A:
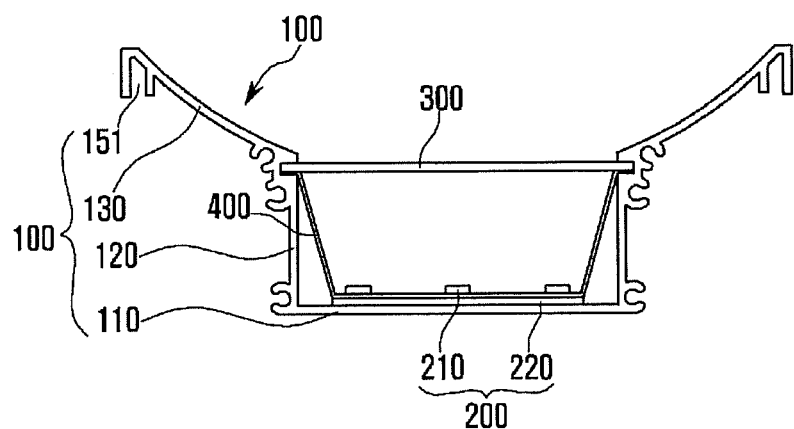
FIGS. 2a to 2d are cross sectional views of a second single lighting module 10B.
Figure 2B:
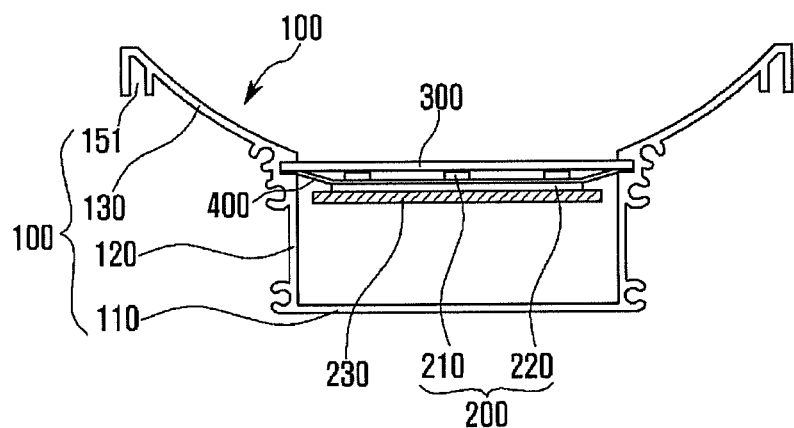
Figure 2C:
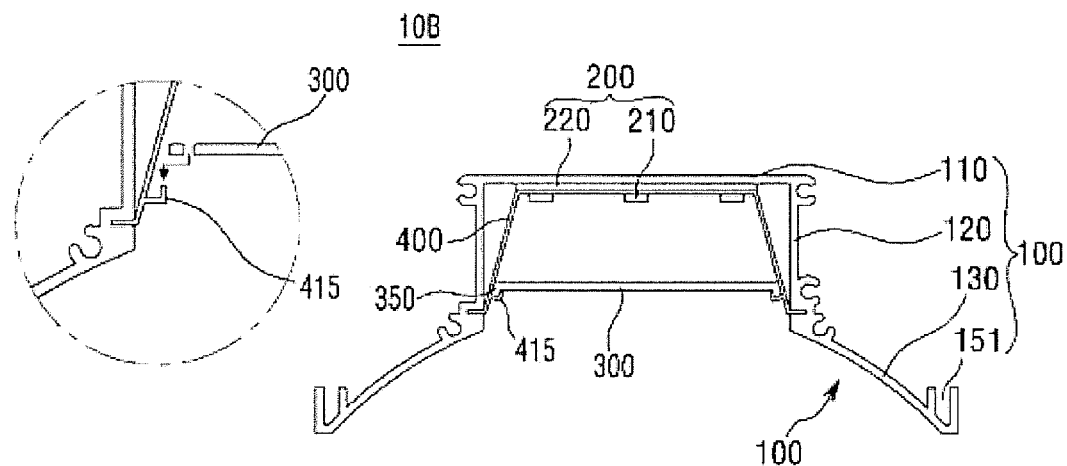
Figure 2D:
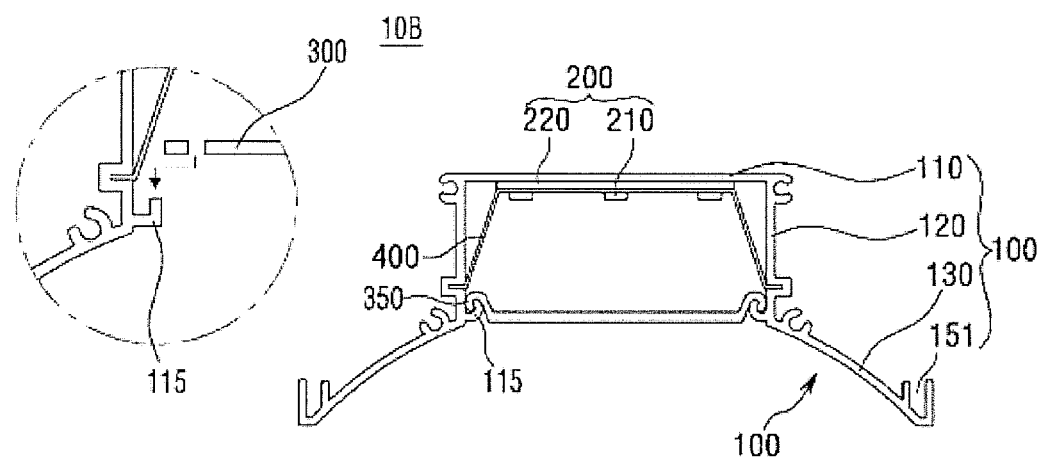
Figure 3A:
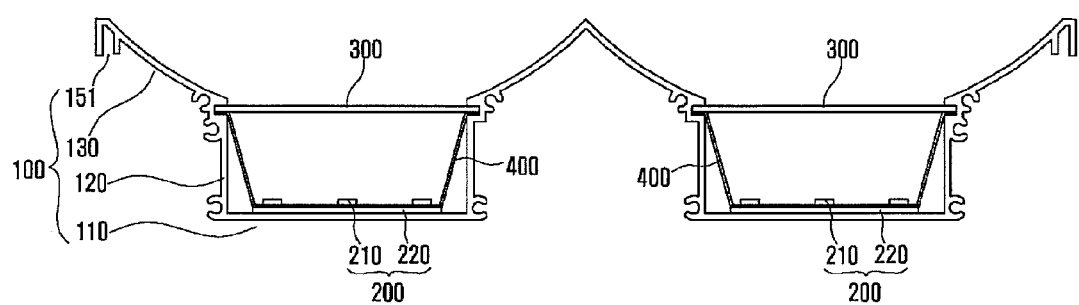
FIGS. 3a to 3d are cross sectional views of a third single lighting module 10C.
Figure 3B:
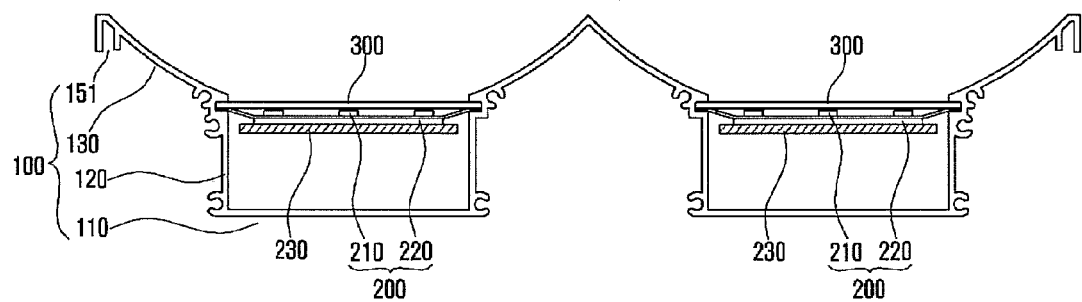
Figure 3C:
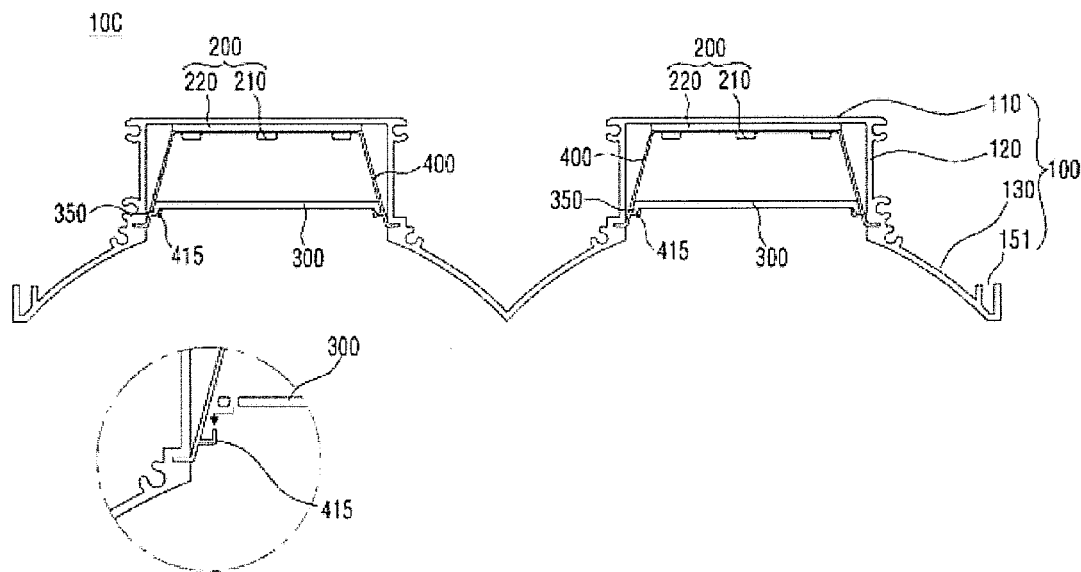
Figure 3D:
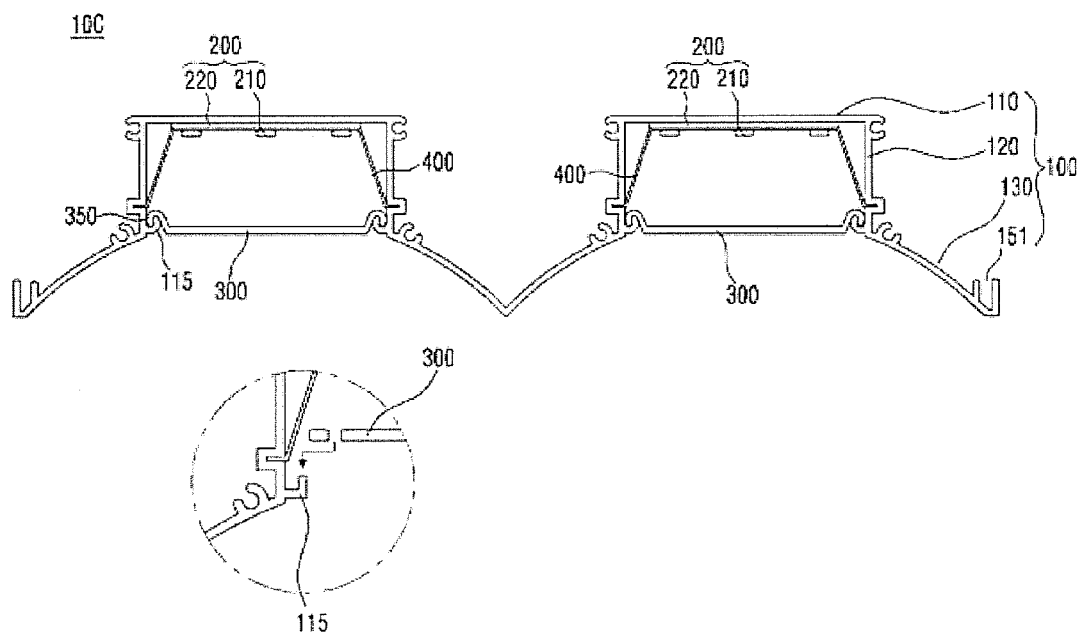

FIGS. 1a to 1b are cross sectional views of a first single lighting module 10A. FIGS. 2a to 2b are cross sectional views of a second single lighting module 10B. FIGS. 3a to 3b are cross sectional views of a third single lighting module 10C. Referring to FIGS. 1a to 3b and 8, the single lighting module 10 may include a case 100, a light emitter 200 disposed on the bottom plate 110 of the case 100, a reflective plate 400 which is in contact with and disposed on the top surface of the light emitter 200 and a diffuser plate 300 spaced from and disposed over the light emitter 200.

As shown in FIGS. 1b, 2b and 3b, the light emitter 200 of the single lighting module 10 may be disposed at a contact area of a side wall 120 of the case 100 and a louver 130 extending from the side wall 120 such that the light emitter 200 is adjacent to the diffuser plate 300. Accordingly, the light emitter 200 may be disposed closer to the diffuser plate 300 than the bottom plate 110 of the case 100. As a result, the amount of light which is emitted directly through the diffuser plate 300 is more than that of the light which is reflected by the reflective plate 400 and emitted through the diffuser plate 300. Therefore, the amount of the light of the lighting device may be increased.

Since the light emitter 200 does not contact with the bottom plate 110 of the case 100, a heat radiator 230 may be further included contacting with a substrate 220 of the light emitter 200 for the purpose of radiating the heat from the light emitter 200. Here, the heat radiator 230 may include either heat radiating fins increasing the surface area radiating heat or a heat radiation sheet 240 to be described later. The heat radiating fins may be adhered to the heat radiation sheet 240. Accordingly, heat radiation performance can be more improved.

Since the light emitter 200 is located at a contact area of the side wall 120 of the case 100 and the louver 130 such that the light emitter 200 is adjacent to the diffuser plate 300, there may be a space between the bottom plate 110 of the case 100 and the light emitter 200. Accordingly, the heat radiator 230 may be disposed between the substrate 220 and the bottom plate 110.

While the lighting device to be described later according to the embodiment includes the single lighting module 10 shown FIGS. 1a, 2a and 3a, the lighting device may include the single lighting module 10 shown FIGS. 1b, 2b and 3b.

Figure 7:
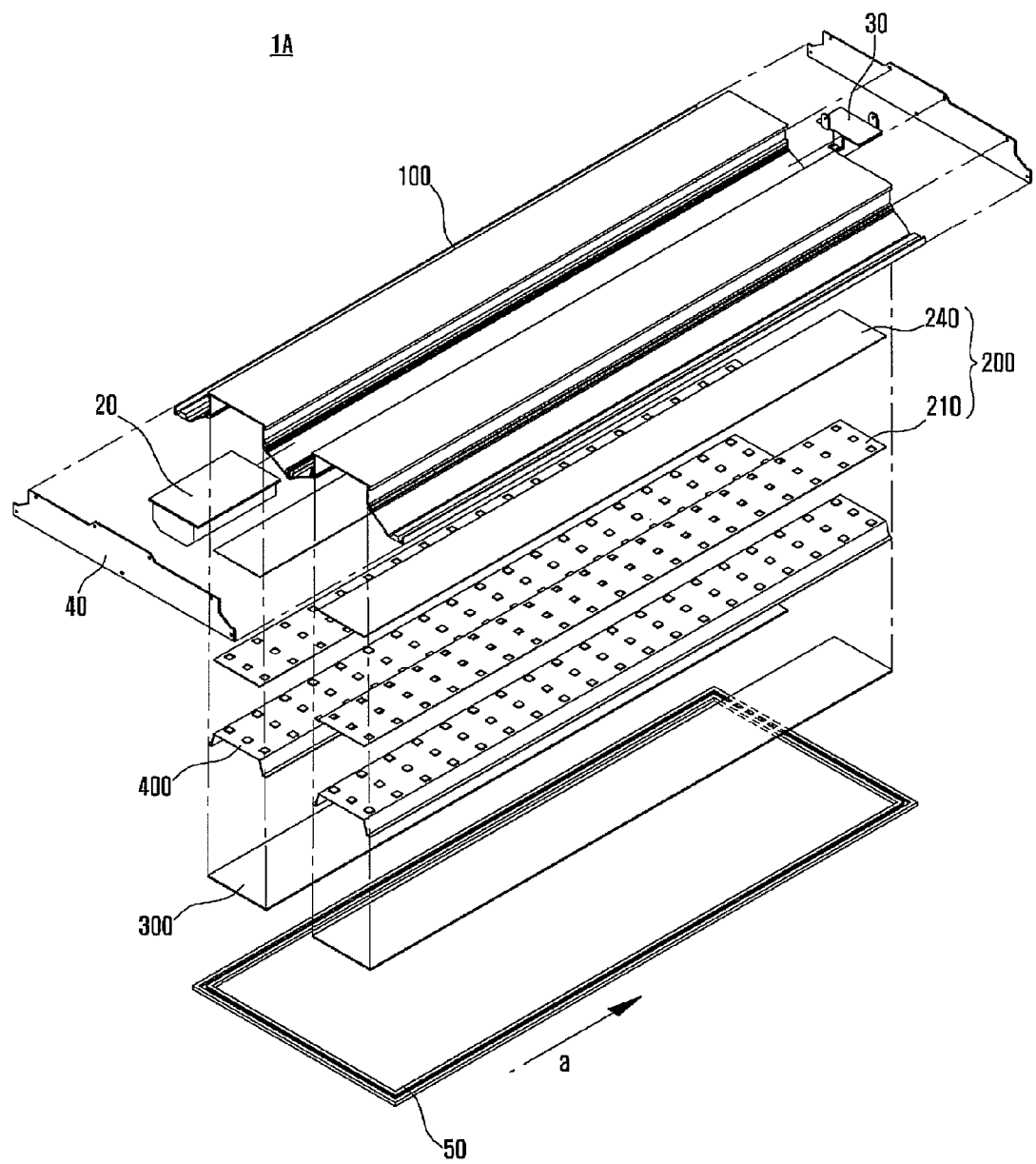
FIG. 7 is an exploded perspective view of the lighting device 1A according to the first embodiment.

The first single lighting module 10A is used to form a lighting device of a first embodiment in which the two first single lighting modules 10A are coupled to each other in a direction perpendicular to the direction "a" in FIG. 7. Otherwise, when a lighting device of a third embodiment is formed by coupling the three single lighting modules 10 having respectively one light emitter 200 in a direction perpendicular to the direction "a" in FIG. 13, the first single lighting modules 10A are arranged at both sides of the three single lighting modules 10. Otherwise, when a lighting device of another embodiment (not shown) is formed by coupling four or more single lighting modules 10 having respectively one light emitter 200 in a direction perpendicular to the direction "a" in FIG. 13, the first single lighting modules 10A are arranged at both sides of the single lighting modules 10.

Referring to FIGS. 1a, 5, 6 and 8, the case 100 of the first single lighting module 10A includes the bottom plate 110, a side wall 120 extending in a perpendicular direction to and from the both side ends of the bottom plate 110, a louver 130 extending from the end of the side wall 120 and inclined at an obtuse angle with respect to the surface of the diffuser plate 300. Like a lighting device 1B of a second embodiment shown in FIGS. 11a, 11b, 12a and 12b, a top plate 140 may be included instead of the louver 130.

A first bracket coupler 151 for interconnecting the single lighting modules 10 is formed at the end of the louver 130 on one side of the case 100 of the first single lighting module 10A. A ceiling fixed type frame 160 is formed at the end of the louver 130 on the other side of the case 100. Here, while the first bracket coupler 151 is formed at the end of the louver 130 on one side of the case 100 of the first single lighting module 10A, the ceiling fixed type frame 160 is not necessarily formed at the end of the louver 130 on the other side of the case 100. Accordingly, the first single lighting module 10A has the first bracket coupler 151 formed at the end of the louver 130 on only one side of the case 100. Here, from this point of view, the first single lighting module 10 is different from the second single lighting module to be later described.

The second lighting module 10B is used to form a lighting device of a fourth embodiment. The lighting device of the fourth embodiment includes only one single lighting module having one light emitter 200. Otherwise, when a lighting device of the third embodiment is formed by coupling the three single lighting modules having respectively one light emitter 200 in a direction perpendicular to the direction "a" in FIG. 13, the second single lighting modules 10B may be arranged in the middle or at both sides of the three single lighting modules 10. Otherwise, when a lighting device of another embodiment (not shown) is formed by coupling four or more single lighting modules having respectively one light emitter 200 in a direction perpendicular to the direction "a" in FIG. 13, the second single lighting modules 10B may be arranged in the middle or at both sides of the single lighting modules 10.

Figure 13:
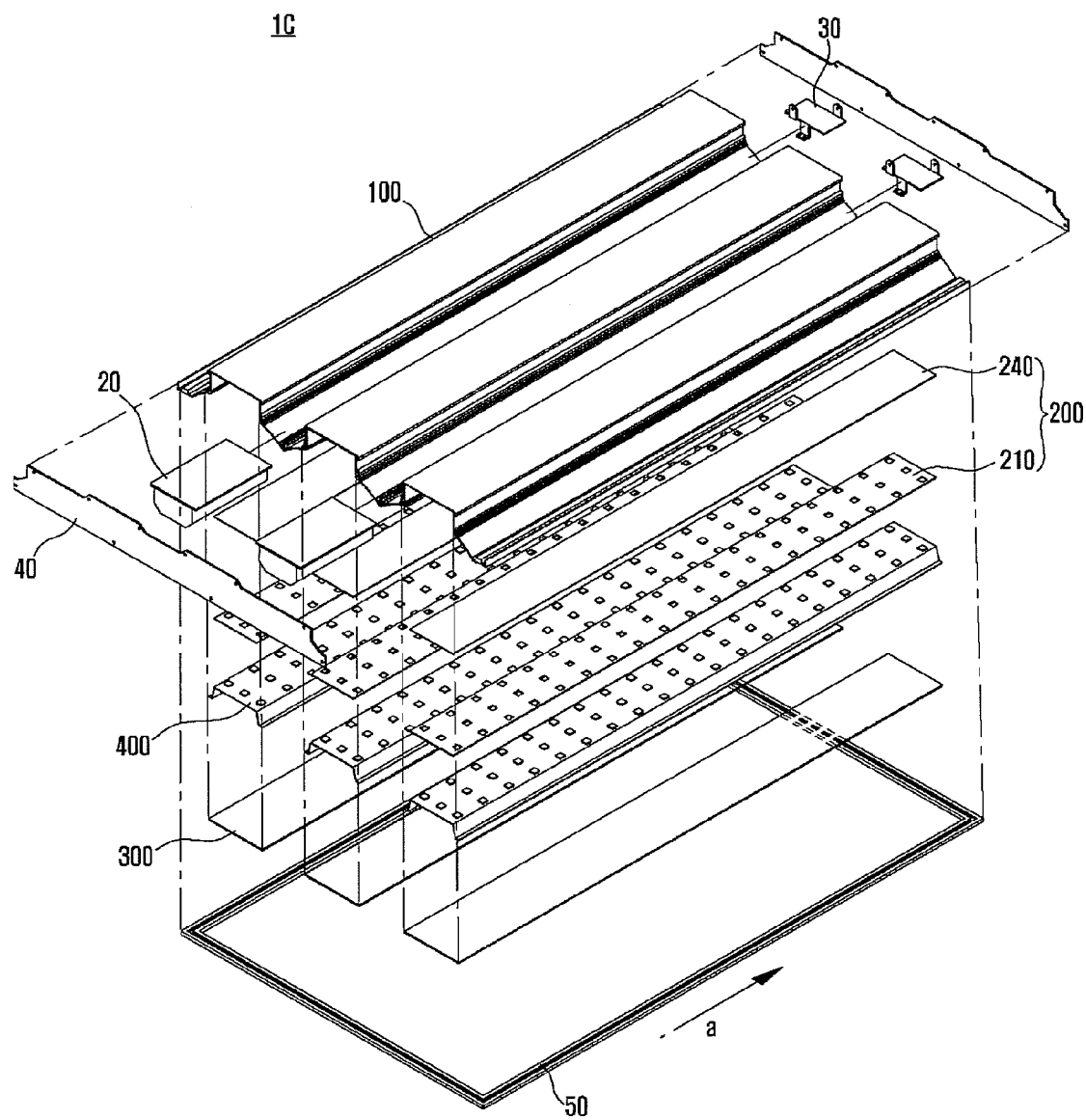
FIG. 13 is a perspective view of a lighting device 1C according to a third embodiment.
Figure 14:
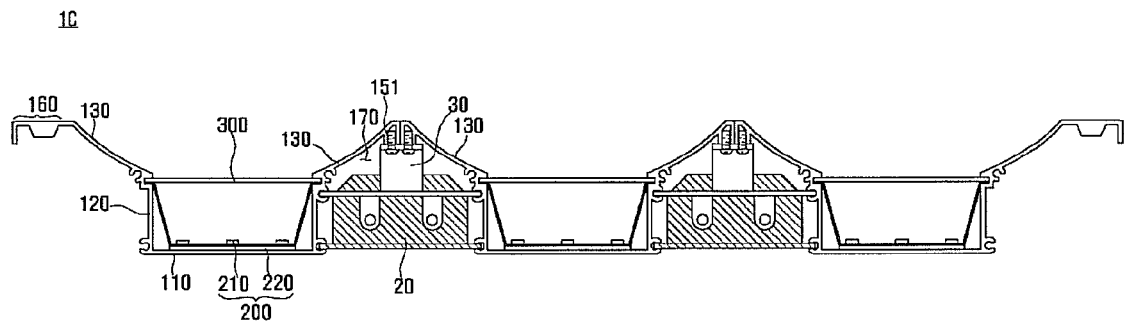
FIG. 14 is a cross sectional view of the lighting device 1C according to the third embodiment.

Referring FIGS. 2a, 13 and 14, the case 100 of the second single lighting module 10B includes the bottom plate 110, the side wall 120 extending in a perpendicular direction to and from the both side ends of the bottom plate 110, the louver 130 extending from the end of the side wall 120 and inclined at an obtuse angle with respect to the surface of the diffuser plate. The top plate 140 may be included instead of the louver 130. The first bracket couplers 151 for interconnecting the single lighting modules 10 is formed at the ends of both louvers 130 of the case 100 of the second single lighting module 10B.

Figure 16:
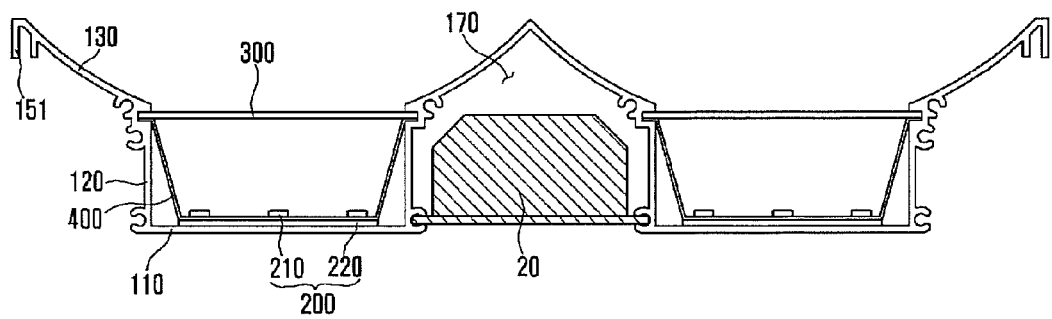
FIG. 16 is a cross sectional view of a lighting device 1E according to a fifth embodiment.

The third single lighting module 10C is used to form a lighting device of a fifth embodiment shown in FIG. 16. The lighting device of the fifth embodiment includes one single lighting module having two light emitters 200. Otherwise, the third single lighting module 10C is used to form a lighting device of a sixth embodiment in which the two third single lighting modules 10C having respectively two light emitters 200 are coupled to each other in a direction perpendicular to the direction "a" of FIG. 19. Otherwise, the third single lighting module 10C is used to faun a lighting device of another embodiment (not shown) in which three or more two third single lighting modules 10C having respectively two light emitters 200 are coupled to each other in a direction perpendicular to the direction "a" of FIG. 19.

The case 100 of the third single lighting module 10C will be described in the following description of the fifth embodiment.

As shown in FIGS. 1c, 1d, 2c, 2d, 3c and 3d, the case 100 and the reflective plate 400 may respectively include projections 115 and 415 projecting to face each other. The diffuser plate 300 may include a locking part 350 by which the projection 115 of the case 100 or the projection 415 of the reflective plate 400 is caught. Accordingly, the diffuser plate 300 is fixed to the case 100 or the reflective plate 400 due to the weight of the diffuser plate 300. As such, the projections 115 and 415 and the locking part 350 make it simpler to fasten the diffuser plate 300 to the case 100 or the reflective plate 400 than to fasten the diffuser plate 300 of FIG. 1a.

The locking part 350 may be a locking projection or a locking hole. The locking hole is shown in dotted lines of FIGS. 1c, 1d, 2c, 2d, 3c and 3d. When the locking part 350 is the locking hole, since the projections 115 and 415 are inserted into the locking hole, the diffuser plate 300 can be more securely fixed to the case 100 or the reflective plate 400.

The characteristics of the lighting device including the single lighting module shown in FIG. 1a, 2a or 3a to be described later can be commonly applied to the lighting device including the single lighting modules shown in FIGS. 1c, 1d, 2c, 2d, 3c and 3d.

First Embodiment

Figure 4:
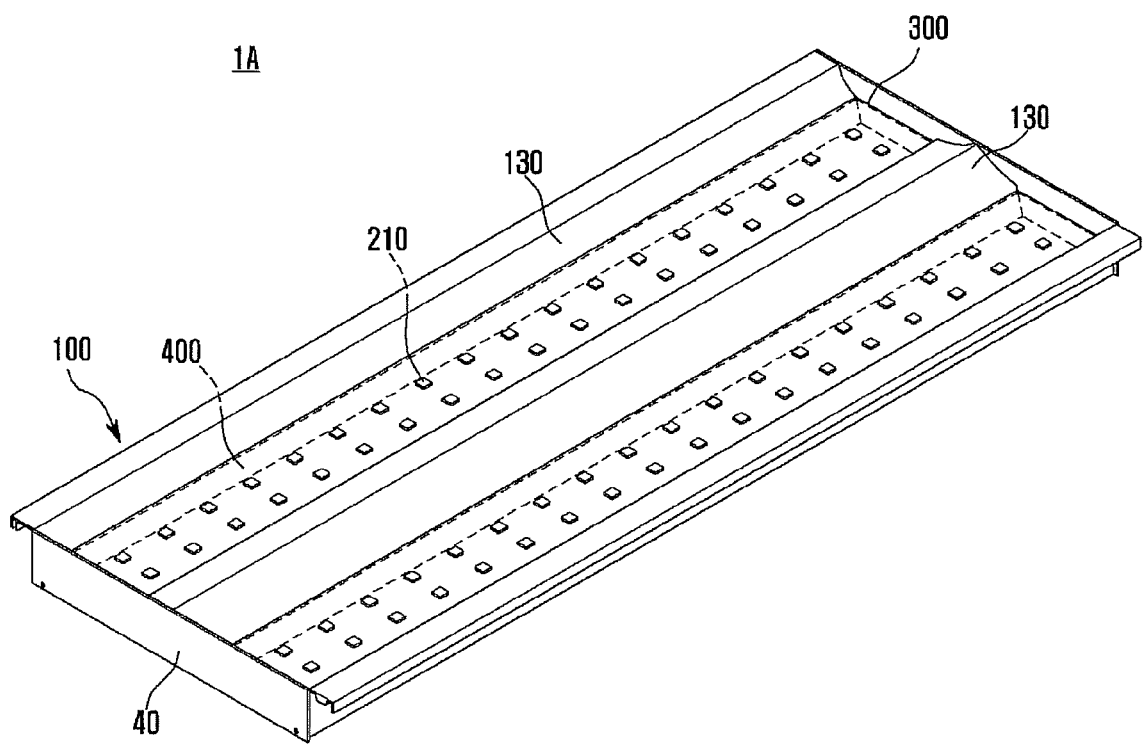
FIG. 4 is a perspective view of a lighting device 1A according to a first embodiment.
Figure 5:
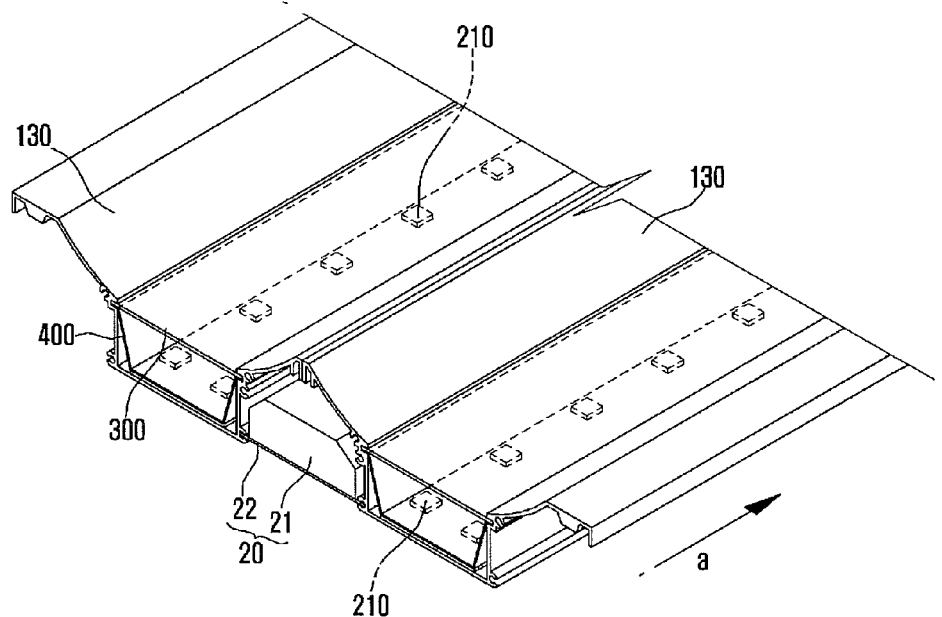
FIG. 5 is a perspective view showing a cross section of the lighting device 1A according to the first embodiment.
Figure 6:
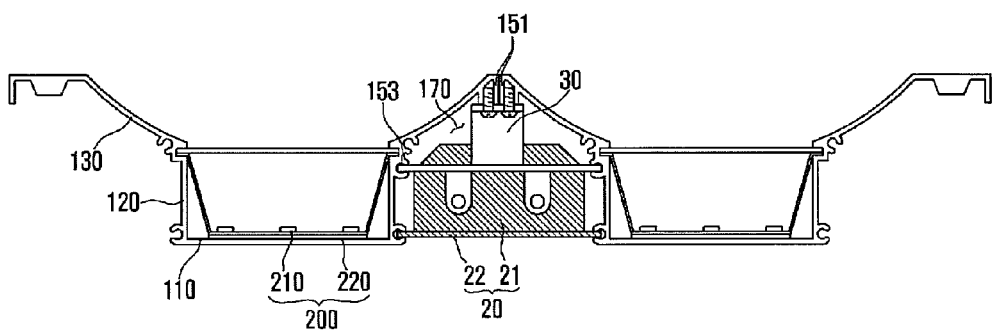
FIG. 6 is a cross sectional view of the lighting device 1A according to the first embodiment.
Figure 8:
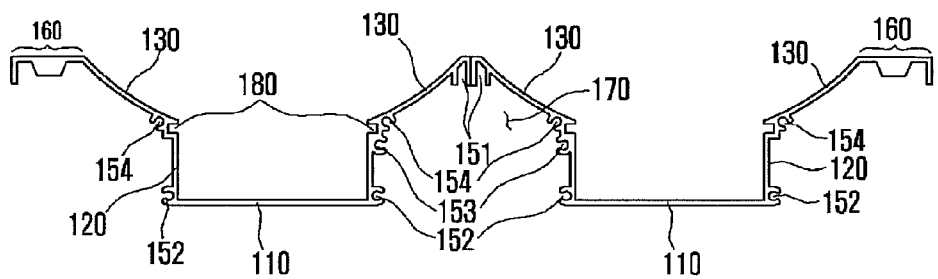
FIG. 8 is a cross sectional view of two cases 100 of the lighting device 1A according to the first embodiment.
Figure 9:
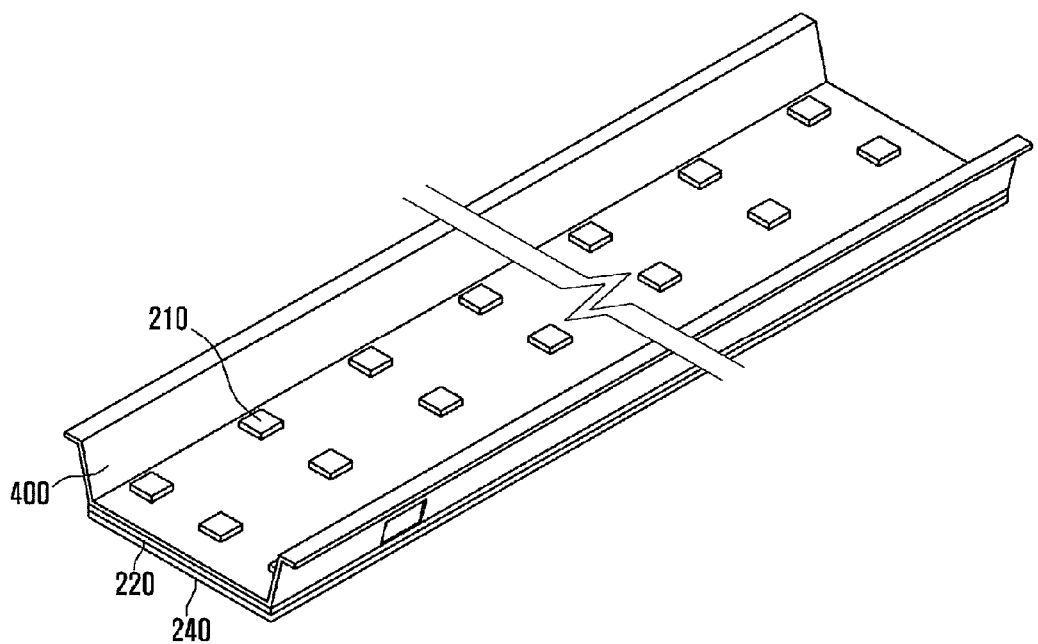
FIG. 9 is a perspective view showing a light emitter 200 coupled to a reflective plate 400.
Figure 10A:
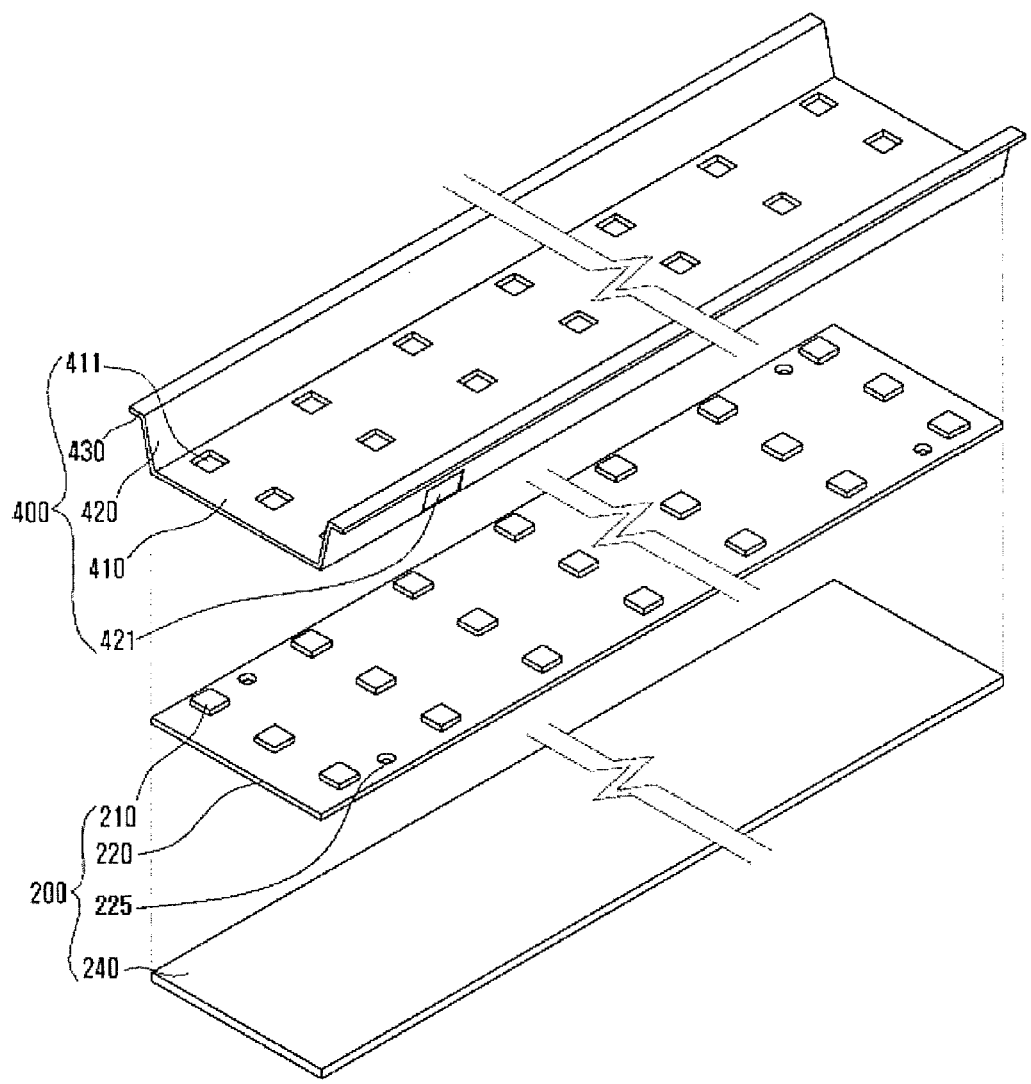
FIGS. 10a and 10b are exploded perspective views of the light emitter 200 and the reflective plate 400.

FIG. 4 is a perspective view of a lighting device 1A according to a first embodiment. FIG. 5 is a perspective view showing a cross section of the lighting device 1A according to the first embodiment. FIG. 6 is a cross sectional view of the lighting device 1A according to the first embodiment. FIG. 7 is an exploded perspective view of the lighting device 1A according to the first embodiment. FIG. 8 is a cross sectional view of two cases 100 of the lighting device 1A according to the first embodiment. FIG. 9 is a perspective view showing a light emitter 200 coupled to a reflective plate 400. FIG. 10a is an exploded perspective views of the light emitter 200 and the reflective plate 400.

Referring to FIG. 4 to 8, the lighting device 1A may include two first single lighting modules 10A, a power supply controller 20 located in a space 170 between the two first single lighting modules 10A, a bracket 30 for interconnecting the two first single lighting modules 10A, and additionally a side cover 40. In FIG. 1a, the first single lighting module 10A used in the first embodiment may include the case 100, the light emitter 200 received by the case 100, and the diffuser plate 300 spaced from the light emitter 200, and additionally the reflective plate 400.

Referring to FIG. 4 to 8, while the two first single lighting modules 10A are included in the first embodiment, the two second single lighting modules 10B may be also used to construct the first embodiment. The second single lighting module 10B has the first bracket couplers 151 formed at the ends of both louvers 130. Therefore, in forming the overall external appearance shown in the first embodiment, the appearance and function of the lighting device formed by coupling the two second single lighting modules 10B are little different from those of the lighting device formed by coupling the two first single lighting modules 10A.

Referring to FIGS. 5 and 6, the light emitter 200 may be arranged on the bottom plate 110 of the case 100. The power supply controller 20 may be arranged in a space 170 between the two first single lighting modules 10A. That is, the space is formed by the louver 130 in which the first bracket coupler 151 are formed and by the side wall 120 connected to the louver 130. In this case, since the power supply controller 20 is stacked under the bottom plate 110 and arranged in a horizontal direction to the bottom plate 110 instead of in a vertical direction, the lighting device 1A has a thickness smaller than that of a usual lighting device.

The ceiling of a building in which a ceiling buried type lighting device is disposed has generally a concrete structure. A structure called an M-BAR or a T-BAR is provided in a direction from the ceiling to the bottom surface of the building. Tex and the like are added to the M-BAR or T-BAR. Generally, in a directly downward type lighting device provided on the ceiling of the building, the power supply controller 20 is stacked under the bottom plate 110 and arranged in a vertical direction, so that the thickness of the lighting device is often greater than 70 mm. However, since electrical wiring and an air conditioning pipe and the like are arranged between the ceiling of the concrete structure and the M-BAR or T-BAR, it is often that a space for disposing a lighting device is very small. Therefore, when a usual directly downward type lighting device is buried and disposed on the ceiling due to the space constraint, it is required that the M-BAR be partly truncated or the lighting device be provided at an undesired position.

On the other hand, since the lighting device 1A according to the first embodiment may have a thickness of about 45 mm, it is possible to freely arrange the lighting device on the ceiling regardless of a narrow space and to easily and simply install the lighting device. The thickness of 45 mm is provided for illustration only in order to compare with a conventional lighting device. Therefore, the size of the lighting device 1A according to the first embodiment may be variously changed depending on numerical values of the thickness of the power supply controller 20 and/or the case 100 and the like.

While the lighting device 1A may have a rectangular shape extending in the first direction "a", the lighting device 1A may have various shapes in accordance with its installation position and its installation environment.

Both louvers 130 of the light emitter 200 is inclined at an obtuse angle with respect to the surface of the diffuser plate 300 for the purpose of allowing light emitted from the light emitter 200 to be emitted and to have a desired light distribution angle and of alleviating glare from the light. If it is not possible to specify an angle based on the diffuser plate 300 due to no diffuser plate 300, the louver 130 may be specified to be extended from the end of the side wall 120 and to be inclined more outward than the side wall 120.

The inclination of the louver 130 may be diversely changed according to the design of the lighting device 1A. Referring to FIGS. 9 and 10a, the light emitter 200 may include LEDs 210, a substrate 220 on which the LEDs 210 are mounted, and a heat radiating sheet 240 arranged under the substrate 220. The substrate 220 may have a coupling hole 225 for coupling the case 100 to the substrate 220. The heat radiation sheet 240 of the single lighting module shown in FIGS. 1a, 2a and 3a contacts with the bottom plate 110 of the case 100 as well as the substrate 220, so that heat is radiated through the heat radiation sheet 240 and the bottom plate 110. Also, the heat radiation sheet 240 of the single lighting module shown in FIGS. 1b, 2b and 3b contacts with the substrate 220, so that heat is radiated through the heat radiation sheet 240. As a result, the heat is radiated to the space between the bottom plate 110 of the case 100 and the light emitter 200.

The lighting device may further include the reflective plate 400. The reflective plate 400 reflects light emitted from the LED 210 to the outside of the lighting device 1 and covers the inner surface of the side wall 120 of the case 100. The reflective plate 400 may cover not only the inner surface of the side wall 120 but the surface of the substrate 220 of the light emitter 200 other than an area on which the LEDs 210 are arranged.

The power supply controller 20 may include a power supply unit (PSU) (not shown) and a driving part (not shown). The power supply unit (PSU) supplies electric power to the lighting device 1A. The driving part controls, starts and operates the light emitter 200.

Referring to FIG. 5, the diffuser plate 300 is disposed apart from the light emitter 200 in the direction in which light is irradiated from the LED 210. The diffuser plate 300 allows the light emitted from the LEDs 210 each of which functions as a point light source to actually function as a surface light source such that the light emitted from the light emitter 200 obtains a uniform luminance with respect to the surface of the diffuser plate 300.

The light emitter 200 is arranged on the bottom plate 110 of the case 100 instead of on the entire surface of the lighting device 1A. Accordingly, when a predetermined number of the LEDs 210 are used, an interval between the LEDs 210 arranged on the bottom plate 110 of the case 100 is less than an interval between the LEDs 210 arranged on the entire surface of the lighting device. Moreover, the amount of the substrate 220 used may be also reduced.

Meanwhile, in order that the light emitted from the LED 210 functioning as a point light source can actually function as a surface light source by passing through the diffuser plate 300, it is necessary to form a diffuse plate surface area in which the light emitted from LED 210 adjacent to the aforesaid LED 210 is superposed on the light emitted from the aforesaid LED 210. This means that the LED 210 should be sufficiently spaced from the diffuser plate 300. However, this may also mean that as the spaced distance is increased, the thickness of the lighting device 1A is increased. Therefore, the distance between the LEDs 210 may be reduced in order to reduce the spaced distance. As described above, since the light emitter 200 is arranged on the bottom plate 110 of the case 100 instead of on the entire surface of the lighting device 1A, the width of the substrate 220 of the light emitter 200 is limited to the width of the bottom plate 110 of the case 100. Eventually, the interval between the LEDs 210 arranged on the substrate 220 is naturally reduced, so that the interval between the LED 210 and the diffuser plate 300 is also reduced. The interval between the LED 210 and the diffuser plate 300 is required to form the surface light source.

Accordingly, thanks to the structural benefits as mentioned above, a slim lighting device 1 can be provided. In a state where there is no diffuser plate 300, if light is irradiated from each of the LEDs to the irradiated area, a hot spot occurs. When the shape of a light source itself is directly irradiated to the irradiated area, an area onto which light is illuminated is more clearly distinct than an area onto which light is not illuminated. Here, an area onto which light is irradiated such that the boundary between the surrounding dark area and the area onto which light is illuminated is clearly formed is referred to as a hot spot. When the hot spot occurs to a general indoor lighting or an outdoor lighting such as a street lamp and the like instead of a spot light, the uniformity of the irradiated area may be reduced. When a surface lighting device is used as shown in the embodiment, the hot spot is reduced more than that of a general point lighting device. Therefore, there are advantages that it is possible to obtain a uniform illuminance distribution of the irradiated area and to reduce the fatigue of the eyes.

Second Embodiment

Figure 11A:
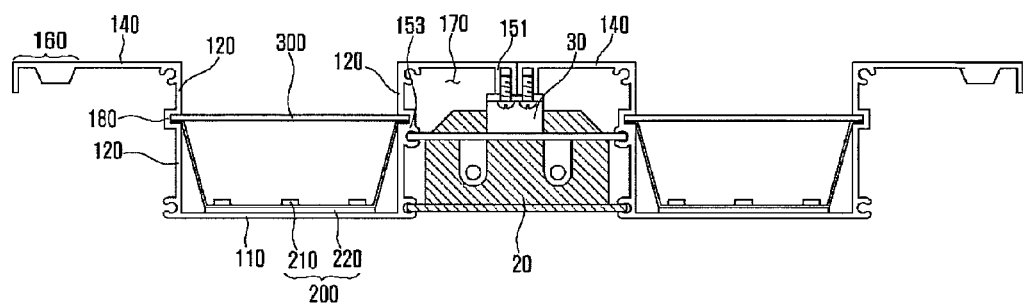
FIGS. 11a and 11b are cross sectional views of a lighting device 1B according to a second embodiment.
Figure 11B:
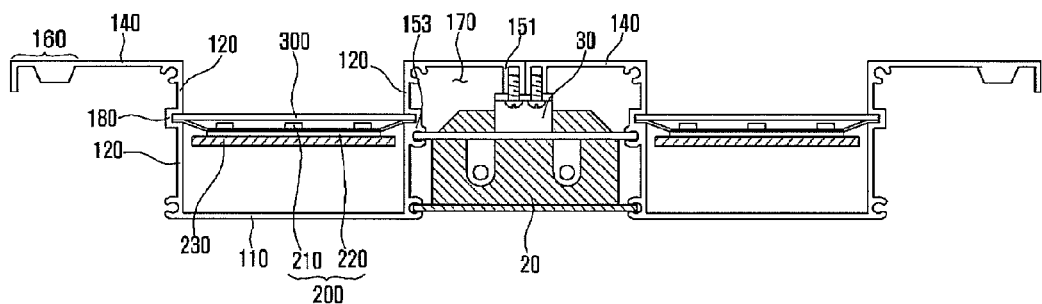
Figure 12A:
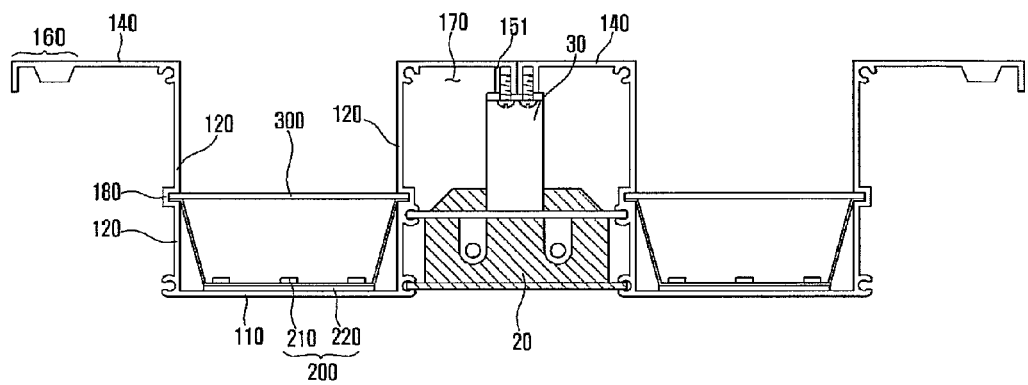
FIGS. 12a and 12b are cross sectional views of another example of the lighting device 1B according to the second embodiment.
Figure 12B:
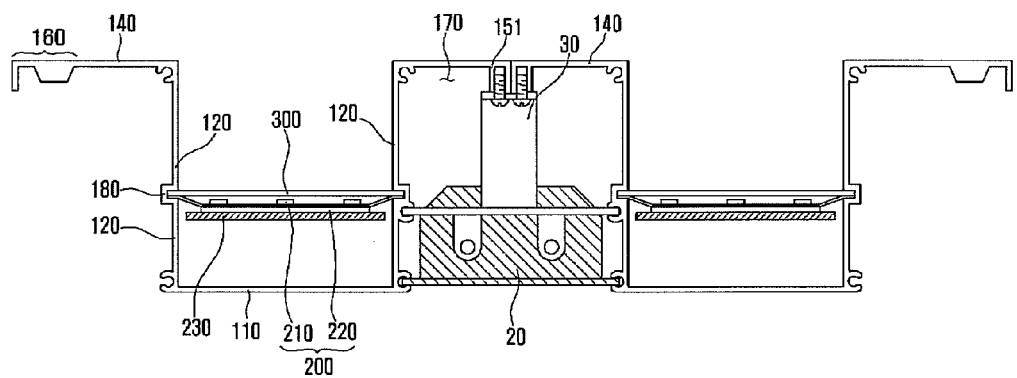

Hereinafter, a lighting device 1B according to a second embodiment will be described in detailed focusing on its components. In description of the second embodiment, the first embodiment will be applied with respect to the same parts as those of the first embodiment. The repetitive description thereof will be omitted. FIGS. 11a and 11b are cross sectional views of a lighting device 1B according to a second embodiment. FIGS. 12a and 12b show another example of the lighting device 1B according to the second embodiment.

The biggest difference between the lighting device according to the second embodiment and the lighting device according to the first embodiment is that the case 100 includes the top plate 140 instead of the louver 130.

Referring to FIGS. 11a, 11b, 12a and 12b, while the two first single lighting modules 10A are included in the second embodiment, it is also possible to construct the lighting device according to the second embodiment by using the two second single lighting modules 10B. The second single lighting module 10B has the first bracket couplers 151 formed at the ends of both top plates 140. Therefore, in forming the overall external appearance shown in the first embodiment, the appearance and function of the lighting device formed by coupling the two second single lighting modules 10B are little different from those of the lighting device formed by coupling the two first single lighting modules 10A.

Referring to FIGS. 12a and 12b, in a state where a distance between the diffuser plate 300 and the light emitter 200 is maintained to be equal to that of FIGS. 11a and 11b, the side wall 120 extends higher than that of FIGS. 11a and 11b, so that a diffuser plate coupling recess 180 is formed in the middle of the side wall 120. In this case, since the side wall 120 is in a direction perpendicular to the bottom plate 110 and/or the diffuser plate 300 and extends higher than the side wall of the first embodiment, the glare may be prevented more effectively than that of the first embodiment. However, the extent of the area of the bottom surface onto which light is irradiated becomes less than that of the first embodiment. Otherwise, the uniformity of the illuminance distribution of the irradiated area is reduced more than that of the first embodiment. Accordingly, it may be possible to install and use the lighting device 1B of the second embodiment in a condition where glare prevention is required prior to both the extent of the area onto which light is irradiated and the illuminance distribution of the irradiated area.

Here, in the single lighting module of FIGS. 11a and 12a, the light emitter 200 is seated on the bottom plate 110 of the case 100. In the single lighting module of FIGS. 11b and 12b, the light emitter 200 of the single lighting module 10 may be disposed at a contact area of the side wall 120 of the case 100 and the top plate 140 extending from the side wall 120 such that the light emitter 200 is adjacent to the diffuser plate 300. Since the heat radiator has been described above, the description thereof will be omitted.

While the lighting device to be described later according to the embodiment includes the single lighting module 10 shown FIGS. 11a and 12a, the lighting device may include the single lighting module 10 shown FIGS. 11b and 12b.

Third Embodiment

Hereinafter, a lighting device 1C according to a third embodiment will be described in detailed focusing on its components. In description of the third embodiment, the first embodiment will be applied with respect to the same parts as those of the first embodiment. The repetitive description thereof will be omitted.

FIG. 13 is a perspective view of a lighting device 1C according to a third embodiment. FIG. 14 is a cross sectional view of the lighting device 1C according to the third embodiment.

Referring to FIGS. 13 and 14, the lighting device 1C may include two first single lighting modules 10A, the one second single lighting module 10B located between the two first single lighting modules 10A, the power supply controller 20 located in one or two spaces 170 formed between the first single lighting module 10A and the second single lighting module 10B, the bracket 130 for interconnecting the single lighting modules 10A and 10B, and additionally the side cover 40. Here, the single lighting modules 10A and 10B may include the case 100, the light emitter 200 received by the case 100, and the diffuser plate 300 spaced from the light emitter 200, and additionally the reflective plate 400. Since the case 100 of the first single lighting module 10A has been already described in the first embodiment, additional description thereof will be omitted.

Referring to FIGS. 13 and 14, while the two first single lighting modules 10A and the one second single lighting module 10B are included in the third embodiment, the three second single lighting modules 10B may be also used to construct the third embodiment. In forming the lighting device by coupling a plurality of the single lighting modules, since the first single lighting module 10A includes only one first bracket coupler 151, the first single lighting module 10A can be used only on both sides of the lighting device. On the contrary to this, the second single lighting module 10B includes the first bracket couplers 151 at the ends of both louvers 130, so that the single lighting module 10B can be used on both sides or in the middle of the lighting device. In addition, the appearance and function of the lighting device formed by coupling the three second single lighting modules 10B are little different from those of the lighting device formed by coupling the two first single lighting modules 10A to the one second single lighting module 10B.

In the third embodiment, at least one power supply controller 20 is required to start and operate the three light emitters 200. While the drawings show that two power supply controllers 20 control the three light emitters 200, one power supply controller 20 is able to control the three light emitters 200. The position of one or more power supply controllers 20 has been already described above.

Though not shown in FIGS. 13 and 14, the lighting device according to the third embodiment may include the top plate 140 instead of the louver 130, like the lighting device according to the second embodiment. Since the embodiment in which the top plate 140 is included instead of the louver 130 has been already described in the second embodiment, the description thereof will be omitted.

Fourth Embodiment

Hereinafter, a lighting device 1D according to a fourth embodiment will be described in detailed focusing on its components. In description of the fourth embodiment, the first embodiment will be applied with respect to the same parts as those of the first embodiment. The repetitive description thereof will be omitted.

Figure 15:
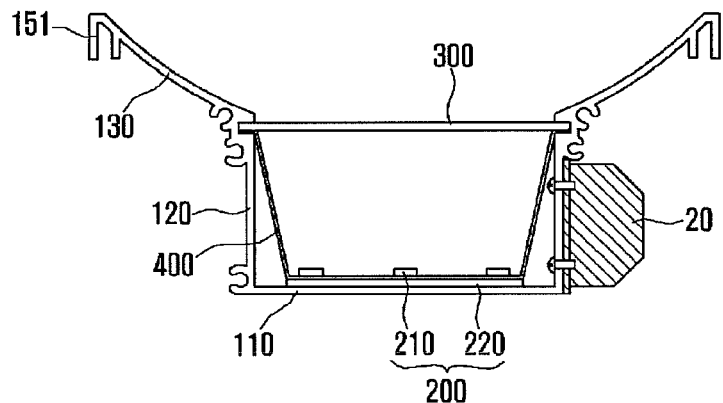
FIG. 15 is a cross sectional view of a lighting device 1D according to a fourth embodiment.

FIG. 15 is a cross sectional view of a lighting device 1D according to a fourth embodiment.

Referring to FIG. 15, the lighting device 1D may include one second single lighting module 10B, the power supply controller 20 located on the outer lateral surface of one side wall 120 among two side walls 120 of the case 100 of the second single lighting module 10B, and additionally the side cover 40. Here, the case 100 of the second single lighting module 10B includes the bottom plate 110, the side wall 120 extending in a perpendicular direction to and from the both side ends of the bottom plate 110, the louver 130 extending from the end of the side wall 120 and inclined at an obtuse angle with respect to the surface of the diffuser plate. The first bracket couplers 151 for interconnecting the single lighting modules 10 is formed at the ends of both louvers 130 of the case 100 of the second single lighting module 10B.

In the fourth embodiment, unlike the first, second and third embodiments, since only one single lighting module 10 is provided, there is no space 170 formed by the two louvers 130 and the side wall 120 connected to the louvers 130. Therefore, the power supply controller 20 is located on the outer lateral surface of one side wall among two side walls 120 of the case 100 of the second single lighting module 10B. Here, unlike the first, second and third embodiments, the power supply controller 20 may be unstably fixed. For this reason, after holes are formed through the side wall and holes are also formed through the power supply controller 20, the holes of the side wall 120 and the holes the power supply controller 20 are aligned with each other. Subsequently, the case 100 can be coupled to the power supply controller 20 by allowing a screw or a pin to pass through the holes formed both in the side wall 120 and in the power supply controller 20. However, a separate bracket (not shown) for coupling the power supply controller 20 to the side wall 120 is formed without forming the hole in the side wall 120 of the case 100, so that the case 100 may be coupled to the power supply controller 20.

Though not shown in FIG. 15, the lighting device according to the fourth embodiment may include the top plate 140 instead of the louver 130, like the lighting device according to the second embodiment. Since the embodiment in which the top plate 140 is included instead of the louver 130 has been already described in the second embodiment, the description thereof will be omitted.

Fifth Embodiment

Hereinafter, a lighting device 1E according to a fifth embodiment will be described in detailed focusing on its components. In description of the fifth embodiment, the first embodiment will be applied with respect to the same parts as those of the first embodiment. The repetitive description thereof will be omitted.

Figure 17:
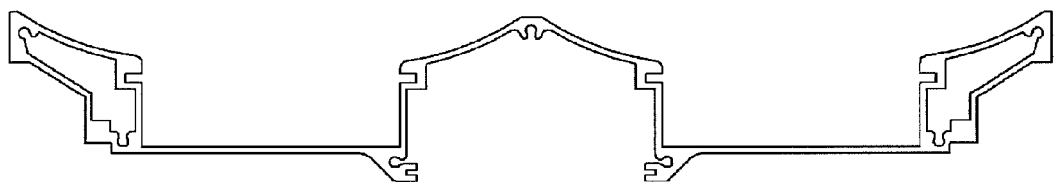
FIG. 17 is a cross sectional view of another example of a case 100 of the lighting device 1E according to the fifth embodiment.
Figure 18:
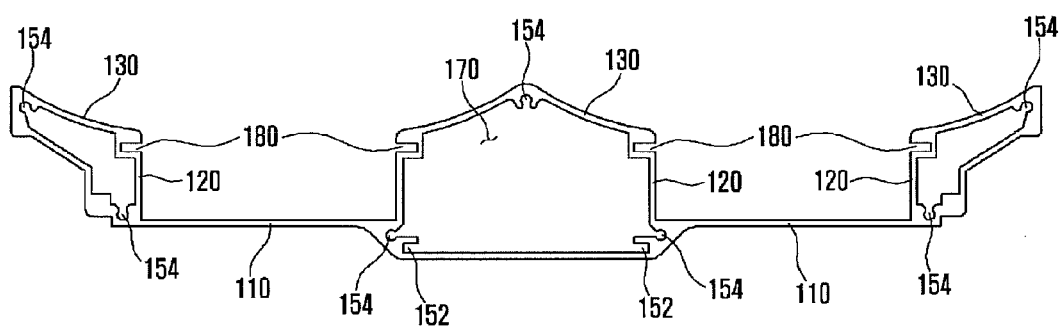
FIG. 18 is a cross sectional view of further another example of the case 100 of the lighting device 1E according to the fifth embodiment.

FIG. 16 is a cross sectional view of a lighting device 1E according to a fifth embodiment. FIG. 17 shows another example of the case 100 of the lighting device 1E according to the fifth embodiment. FIG. 18 shows further another example of the case 100 of the lighting device 1E according to the fifth embodiment.

The biggest difference between the lighting device according to the fifth embodiment and the aforesaid lighting devices according to the first, the second and the third embodiments is that the fifth embodiment uses the third single lighting module 10C including two light emitters 200 instead of the first and the second single lighting modules 10A and 10B which include one light emitter.

Referring to FIG. 16 to 18, the width of the third single lighting module 10C used in the lighting device according to the fifth embodiment is approximately twice as large as widths of the first and the second single lighting modules 10A and 10B used in the lighting device according to the first to the fourth embodiments. The fifth embodiment includes only one single lighting module and a space for receiving the power supply controller 20 without interconnecting the single lighting modules.

Compared with FIG. 17, FIG. 18 shows that the case 100 may further include a cover part formed therein for covering the space 170 for receiving the power supply controller 20. The power supply controller 20 is surrounded by the case 100, so that the power supply controller 20 cannot be seen when the case 100 is viewed from the top thereof and the bottom thereof.

Referring to FIG. 16, even though the first bracket coupler 151 for interconnecting the single lighting modules 10 is formed at the ends of both louvers 130 of the case 100 of the third single lighting module 10C, the first bracket coupler 151 may be formed at the end of only one louver 130 among both the outer louvers 130.

Referring to FIGS. 17 and 18, unlike the case 100 used in FIG. 16, the case 100 includes a closed space formed therein by the outermost louver 130, the outermost side wall 120 and an additional member spaced apart from the outermost louver 130 and the outermost side wall 120. With respect to the additional member, heat generated by the operation and the like of the lighting device is transferred to the additional member, so that the whole case is able to function as a heat radiation body. As a result, the surface area of the heat radiation body is increased, thereby improving the heat radiating effect thereof. The case 100 may be formed through an extruding molding method in order to more enhance the heat radiating effect by using the additional member.

Referring to FIG. 16, the lighting device 1E may include one third single lighting module 10C, the power supply controller 20 located in the space 170 formed by the two inner side walls 120 and the two louvers 130 of the third single lighting module 10C, and additionally the side cover 40. Here, the third single lighting module 10C may include the case 100, two light emitters 200 received by the case 100, and two diffuser plates 300 spaced from the two light emitters 200, and additionally the reflective plate 400.

The case 100 of the third single lighting module 10C includes two bottom plates 110, four side walls 120 extending in a perpendicular direction to and from the both side ends of each of the two bottom plates 110, the louvers 130 extending from the end of the side wall 120 and inclined at an obtuse angle with respect to the surface of the diffuser plate 300. The ends of the two inner louvers 130 are connected to each other. If there is no diffuser plate 300, the louver 130 may be specified to be extended from the ends of the two outermost side walls 120 and to be inclined more outward than the side wall 120.

Though not shown in FIG. 16 to 18, the lighting device according to the fifth embodiment may include the top plate 140 instead of the louver 130, like the lighting device according to the second embodiment.

Sixth Embodiment

Hereinafter, a lighting device 1F according to a sixth embodiment will be described in detailed focusing on its components. In description of the sixth embodiment, the fifth embodiment will be applied with respect to the same parts as those of the fifth embodiment. The repetitive description thereof will be omitted.

Figure 19:
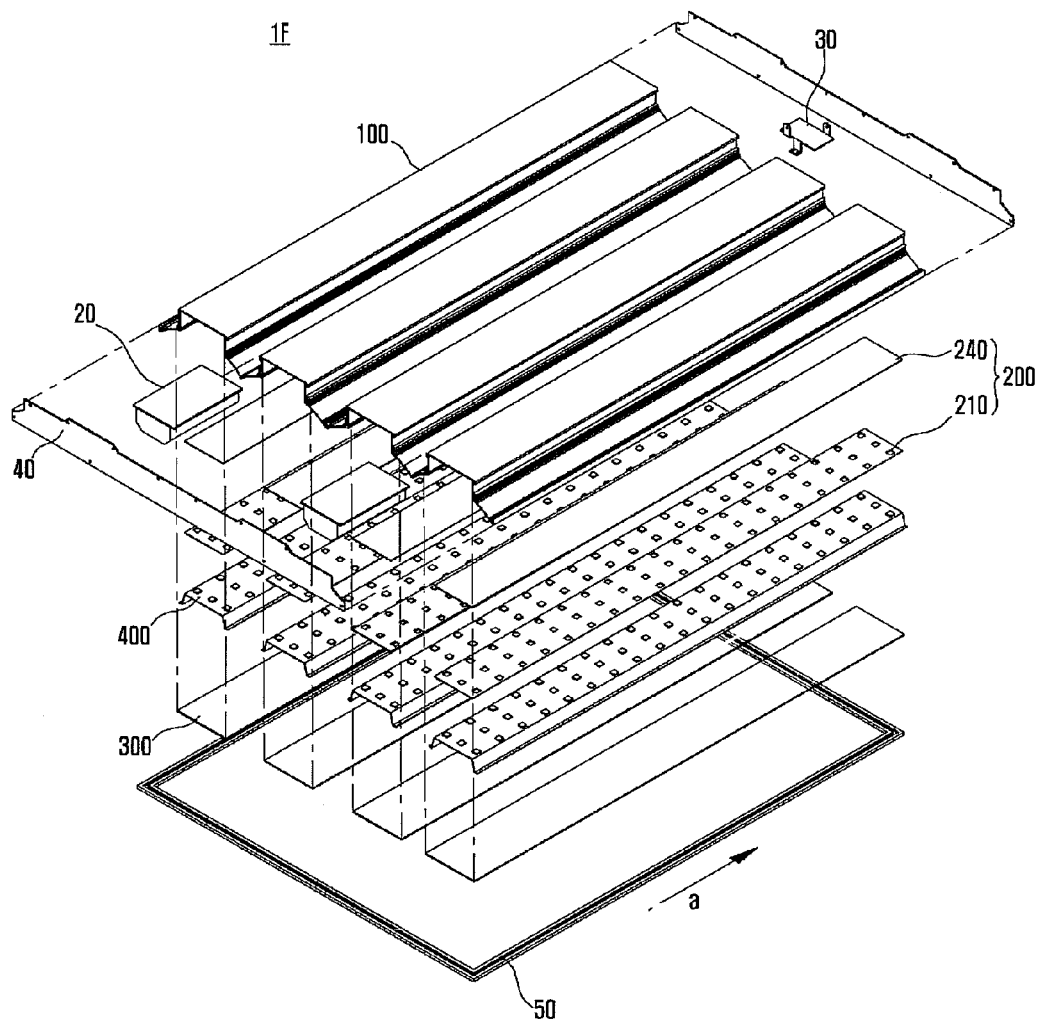
FIG. 19 is an exploded perspective view of a lighting device 1F according to a sixth embodiment.
Figure 20:
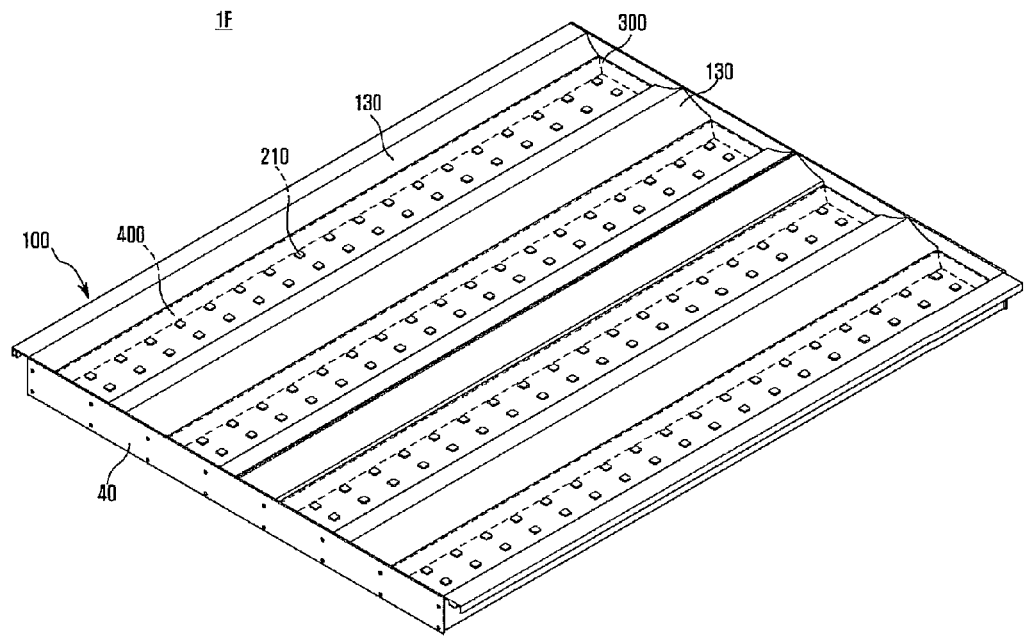
FIG. 20 is a perspective view of the lighting device 1F according to the sixth embodiment.
Figure 21:
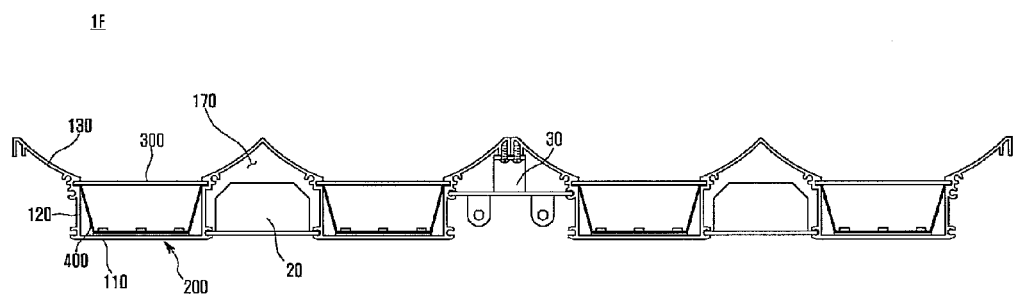
FIG. 21 is a cross sectional view of the lighting device 1F according to the sixth embodiment.

FIG. 19 is an exploded perspective view of a lighting device 1F according to a sixth embodiment. FIG. 20 is a perspective view of the lighting device 1F according to a sixth embodiment. FIG. 21 is a cross sectional view of the lighting device 1F according to a sixth embodiment.

Like the lighting device 1E according to the fifth embodiment, the lighting device 1F according to the sixth embodiment uses the third single lighting module 10C including two light emitters 200. Therefore, the lighting device 1F according to the sixth embodiment may use the cases 100 of FIGS. 17 and 18.

Referring to FIG. 19 to 21, the lighting device 1F may include two third single lighting modules 10C, the power supply controller 20 located in the space 170 formed by the two inner side walls 120 and the two louvers 130 of each of the third single lighting modules 10C, and additionally the side cover 40. Here, unlike the lighting device shown in FIG. 19 to 21, the lighting device may include only one power supply controller 20 instead of two power supply controllers 20. In this case, the one power supply controller 20 controls the total of four light emitters 200. The power supply controller 20 may be located either in the space 170 formed by the two louvers 130 and the two inner side walls 120 of the third single lighting module 10C or in a space formed by coupling the two third single lighting modules through the bracket 30 in FIG. 21.

The lighting device 1F according to the sixth embodiment may include the top plate 140 instead of the louver 130, just like the lighting device according to the fifth embodiment. Since the embodiment in which the top plate 140 is included instead of the louver 130 has been already described in the fifth embodiment, the description thereof will be omitted.

Unlike the cases 100 of the third single lighting module shown in FIGS. 3a, 3b and 16, the first bracket coupler 151 may formed at the end of only one louver 130 among both the outer louvers 130. In this case, only two third single lighting modules 10C can be coupled to each other. Three or more third single lighting modules 10C cannot be coupled to each other. Therefore, there is no problem in implementing the sixth embodiment. However, it is not possible to create a lighting device having a size larger than that of the sixth embodiment.

Hereinafter, the components of the lighting device 1 will be described.

<Case 100>

Since the structure of the case 100 has been already described in the first to the sixth embodiments, the description thereof will be omitted.

Referring to FIGS. 6 and 8, when the single lighting modules are coupled adjacently to each other, the power supply controller 20 is arranged in the space 170 formed by the louver 130 and the side wall 120. When a second projection 22 formed in the lower end of the power supply controller 20 is pushed in a sliding way into a power supply controller coupling recess 152 formed at the boundary between the side wall 120 and the bottom plate 110 of the case 100, the case 100 can be strongly coupled to the power supply controller 20.

Meanwhile, the power supply controller coupling recess 152 is not necessarily formed extending as much as the length of the case 100 in the first direction "a" shown in FIG. 7. For example, the power supply controller coupling recess 152 may be extended relatively extremely short and be a thin plate having a shape of alphabet letter "C" or "O". In addition, without the power supply controller coupling recess 152, after holes are formed through the side wall 120 of the case 100 and holes are also formed through the power supply controller 20, the holes of the side wall 120 and the power supply controller 20 are aligned with each other. Subsequently, the case 100 is coupled to the power supply controller 20 by allowing a screw or a pin to pass through the holes formed both in the side wall 120 and in the power supply controller 20. However, if the power supply controller coupling recess 152 is formed in the case 100, it is easier to produce the case 100 by using an extruding molding method and it is simple to couple the case 100 to the power supply controller 20 without an additional screw or a pin.

The bracket coupler includes the first bracket coupler 151 and a second bracket coupler 153. The first and the second bracket couplers 151 and 153 may be formed in the case 100. The first and the second bracket couplers 151 and 153 are connected to the bracket 30, so that the single lighting modules are securely interconnected to each other. A side cover coupling recess 154 may be formed in the case 100. The side cover coupling recess 154 is used to couple the side cover 40 to the case 100. A method by which the side cover coupling recess 154 are coupled to the side cover 40 will be described in another part of this application.

The case 100 is formed of a metallic material or a resin material and the like which has a good heat radiating characteristic. An aluminum (Al) oxide film or silver (Ag) oxide film is formed on the surface of the case 100, so that the abrasion resistance, corrosion resistance and endurance of the case 100 can be obtained and a good appearance of the lighting device 1 can be obtained. The louver 130 performs an essential function of preventing the glare. Additionally, the surface of the louver 130 is surface treated to be well reflective or includes a reflective member attached thereto, so that the louver 130 is able to improve a luminous efficiency by functioning as a reflective plate, as well as to prevent the glare.

The case 100 may be produced by integrally assembling separately produced bottom plate 110, side wall 120 and louver 130 or may be entirely integrally produced. For example, the case 100 may be formed by using an extruding molding method. The case 100 may be simultaneously integrally formed with the bottom plate 110, the side wall 120, the louver 130, the diffuser plate coupling recess 180, the first and the second bracket coupler 151 and 153, the power supply controller coupling recess 152 and the side cover coupling recess 154. The case 100 is generally integrally formed in the direction of length thereof. If the case 100 is integrally formed by using the extruding molding method and the like, the cross section formed by cutting the case 100 in a direction perpendicular to the longitudinal direction thereof has a uniform shape. For example, the shape of the cross section formed by cutting the middle part of the case 100 is the same as the shape of the cross section formed by cutting a part close to the end of the case 100. When the case 100 is integrally produced, it is possible to reduce the efforts to assemble the various members and to simplify the manufacturing process.

In producing the case 100, it is not necessary that the described diffuser plate coupling recess 180, the first and the second bracket coupler 151 and 153, the power supply controller coupling recess 152 and the side cover coupling recess 154 and the like are simultaneously produced. It is also possible to allow at least one member to be integrally produced with the case 100. For example, if necessary, the case 100 may be produced to include only the bottom plate 110, the side wall 120, the louver 130 and the diffuser plate coupling recess 180 formed therein. Otherwise, the case 100 may be produced to include only the bottom plate 110, the side wall 120, the louver 130 and the first and the second bracket coupler 151 and 153 formed therein.

Referring to FIG. 8, the diffuser plate coupling recess 180 may be formed at the boundary between the inner surface of the side wall 120 and the upper surface of the louver 130. Referring to FIGS. 11a and 12a, when the top plate 140 is provided instead of the louver 130, the diffuser plate coupling recess 180 may be formed in the middle of the inner surface of the side wall 120 or at the point, which is close to the top plate 140, of the inner surface of the side wall 120.

Referring to FIG. 8, at least one of the first and the second bracket coupler 151 and 153, the power supply controller coupling recess 152 and the side cover coupling recess 154 may be formed on the outer surface of the side wall 120 of the case 100 or on the bottom surface of the louver 130. Referring to FIGS. 11a and 12a, when the top plate 140 is provided instead of the louver 130, at least one of the first and the second bracket coupler 151 and 153, the power supply controller coupling recess 152 and the side cover coupling recess 154 may be formed on the outer surface of the side wall 120 of the case 100 or on the bottom surface of the top plate 140.

The case 100 is integrally formed. Therefore, since heat can be effectively transferred to the entire case 100 and be radiated, the lighting device can have a good heat radiating characteristic. Based on an embodiment, the louver 130 may be replaced by the top plate 140. In more detail, when the case 100 is formed by assembling separately produced members, the members do not come in complete contact with each other but come in partial point contact with each other. As a result, heat transferred from the light emitter 200 to the bottom plate 110 is not sufficiently transferred to the side wall 120, and the heat of the side wall 120 is not sufficiently transferred to the louver 130, either. Therefore, all members of the case 100 cannot be sufficiently used as a heat radiating body. However, when the case 100 is integrally formed by using an extruding molding method, the entire case 100 corresponds to a single member. Therefore, heat generated by the light emitter 200 or the power supply controller 20 is uniformly transferred from the bottom plate 110 through the side wall 120 to the louver 130, so that an excellent heat radiating effect is obtained.

The heat radiating effect will be additionally described. As described in the fifth embodiment, an additional member forming the case 100 may be formed in the lower part of the outermost louver 130. The additional member is intended to improve the heat radiating effect by increasing the surface area of the case 100. For this reason, the case 100 may have any shape capable of enhancing the heat radiating effect by enlarging the surface area thereof. Accordingly, the additional member is able to form a closed surface with the louver 130 and the side wall 120. The closed surface may have heat radiating holes formed therein. Also, the louver 130 or the side wall 120 may have an uneven structure formed thereon and function as a heat radiating fin.

Figure 39:
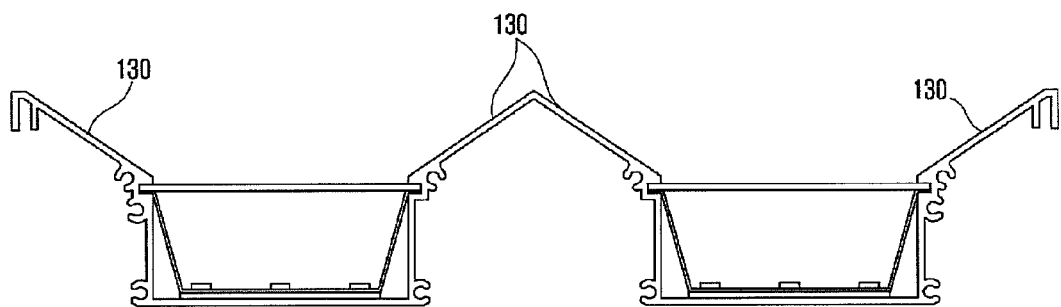
FIG. 39 is a cross sectional view of a lighting module including a louver 130 having another shape.
Figure 40:
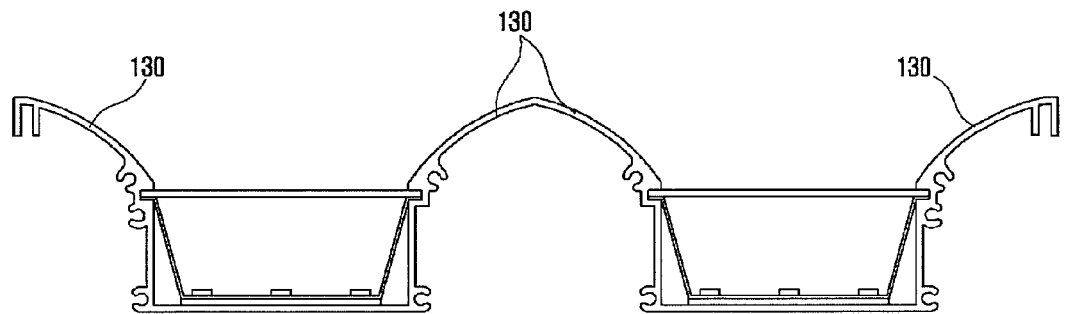
FIG. 40 is a cross sectional view of a lighting module including the louver 130 having further another shape.

FIG. 39 is a cross sectional view of a lighting module including louvers 130 having different shapes from each other. FIG. 40 is a cross sectional view of a lighting module including a louver 130 having another different shape. Referring to FIGS. 39 and 40, the louver 130 may have a cross section having various shapes such as a rectilinear shape, a parabolic shape or a circular arc shape and the like. However, how much louver cut-off angle "θ" the louver 130 has is more meaningful than what shape itself the louver 130 has.

The lighting device including the louver 130 formed therein has its specific louver cut-off angle "θ". It is the most important objective that the glare is prevented by allowing the diffuser plate 300 not to directly come into sight at the specific louver cut-off angle "θ". Therefore, the lighting device is required to have an appropriate louver cut-off angle "θ".

Figure 41:
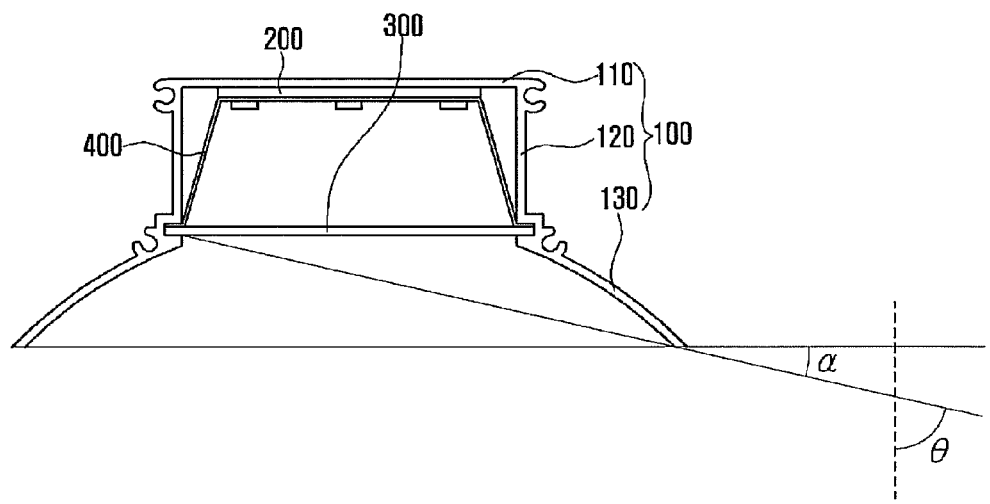
FIG. 41 is a view for describing a louver cut-off angle $\theta$ and a cover angle $\alpha$ of the cover angle of the lighting device according to the embodiment.

FIG. 41 is a view for describing a louver cut-off angle "θ" and a cover angle α of a cover angle. Referring to FIG. 41, unlike the louver 130 of FIG. 41, when the louver 130 is formed to be almost aligned with the side wall 120 so as to reduce the glare, the louver cut-off angle "θ" is reduced, and the cover angle α is increased. This means that the glare does not occur at an angle larger than the louver cut-off angle "θ". Therefore, the fatigue of the eyes caused by the glare can be reduced by being away at even a short distance from the lighting device. However, a light diffusion range is excessively reduced, so that the irradiated area becomes smaller.

On the contrary, unlike the louver 130 of FIG. 41, when the louver 130 is formed almost parallel with the side wall 120, the louver cut-off angle "θ" is increased, and the cover angle α is reduced. This means that the glare does not occur at an angle larger than the louver cut-off angle "θ". However, since the louver cut-off angle "θ" has been already excessively enlarged, the fatigue of the eyes caused by the glare may occur. Meanwhile, a light diffusion range is sufficiently increased, so that the irradiated area becomes larger.

Accordingly, a lighting device giving a priority to the increase of the area to which light is irradiated is required to enlarge the louver cut-off angle "θ". A lighting device giving a priority to the prevention of the glare is required to reduce the louver cut-off angle "θ".

The louver cut-off angle "θ" may have a value between 0° and 90°. When the louver cut-off angle "θ" has a value within the aforementioned range, direct light from the diffuser plate 300 cannot be seen as the lighting device is viewed from one side to the other side of the diffuser plate 300.

Since the light emitter 200 is arranged on the bottom plate 110 of the case 100, the bottom plate 110 has a width and a length for arranging the light emitter 200. The diffuser plate coupling recess 180 may be formed at a position where the side wall 120 and the louver 130 are in contact with each other. The diffuser plate 300 and/or a fixing protrusion 430 of the reflective plate 400 may be inserted and fixed into the diffuser plate coupling recess 180. The diffuser plate coupling recess 180 may have a shape extending in the first direction "a" shown in FIGS. 7, 13 and 19.

The diffuser plate 300 and/or a fixing protrusion 430 of the reflective plate 400 are pushed in a sliding way into the diffuser plate coupling recess 180. The side cover 40 is coupled to at least one end of the case 100. Then, the diffuser plate 300 and/or the reflective plate 400 are sufficiently securely fixed. As a result, during the operation of the installed lighting device or the transfer of the lighting device, the diffuser plate 300 and/or the reflective plate 400 are not expected to be separated from the lighting device.

FIGS. 1a, 1b, 2a, 2b, 3a and 3b show that the side wall 120 of the case 100 extends in a direction perpendicular to the bottom plate 110. Here, the side wall 120 may extend perpendicular to or substantially close to perpendicular to the bottom plate 110. Also, the side wall 120 may be inclined more outward with the increase of distance from the bottom plate 110 to the side wall 120. Though not shown, an uneven structure is formed on the bottom surface of the case 100, so that the surface area of the case 100 is increased and the heat radiating characteristic of the lighting device can be improved.

<A Plurality of Light Emitters 200>

FIG. 9 is a perspective view showing a light emitter 200 coupled to a reflective plate 400. FIG. 10a is an exploded perspective views of the light emitter 200 and the reflective plate 400.

Referring to FIGS. 9 and 10a, the light emitter 200 may include a plurality of LEDs 210, the substrate 220 on which a plurality of the LEDs 210 are mounted, and the heat radiating sheet 240 arranged under and in contact with the substrate 220.

A plurality of the LEDs 210 may include at least one LED emitting red, green, blue, white and yellow light and the like. For example, a plurality of the LEDs 210 include a red LED, a green LED and a blue LED. Also, a plurality of the LEDs 210 may be formed through combination of LEDs emitting various colored lights.

A plurality of the LEDs 210 may be mounted on the substrate 220. A printed circuit board (PCB) may be used as the substrate 220. The PCB is fabricated by printing a circuit pattern on an insulator and includes an aluminum substrate, a ceramic substrate, a metal core PCB and a usual PCB and the like. The surface of the substrate 220 may be coated with or painted with white or silver color in order to increase reflection efficiency.

The substrate 220 includes a circuit capable of starting and operating a plurality of the LEDs 210. As shown in FIGS. 9 and 10a, a plurality of the LEDs 210 may be arranged along the rows and columns on the substrate 220 or arranged in various ways. The number of the LEDs may be greater or less than that of the LEDs 210 shown in the drawings. However, if the number of the LEDs is exceedingly small, the lighting device has a difficulty in functioning as a surface lighting device. Therefore, an appropriate number of the LEDs 210 may be arranged in consideration of the function of a surface lighting device.

A coupling hole 225 may be formed on the substrate 220. The substrate 220 may be coupled to the case 100 by inserting a screw or a pin into the coupling hole 225. The heat radiating sheet 240 is arranged contacting with the bottom surface of the substrate 220. The heat radiating sheet 240 receives heat generated from a plurality of the LEDs 210 through the substrate 220 and radiates the heat or transfers the heat to the entire case 100. The heat radiating sheet 240 may be made of a material capable of effectively radiating heat, such as a resin material or a metallic material. Also, the heat radiating sheet 240 may be made of a viscous material and easily adhered to the bottom surface of the substrate 220.

<Reflective Plate 400>

Figure 22:
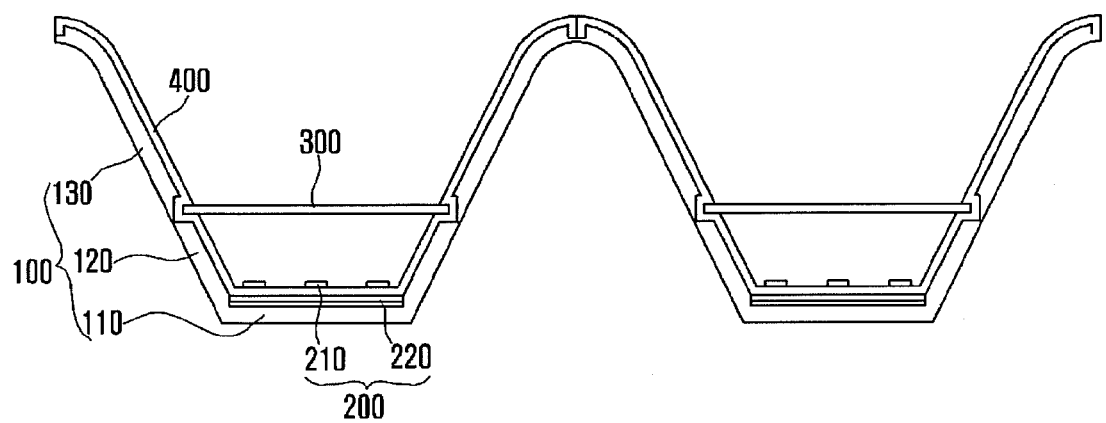
FIG. 22 is a cross sectional view of another example of the reflective plate 400.

FIG. 22 is a cross sectional view of another example of the reflective plate 400. The reflective plate 400 will be described with reference to FIGS. 9, 10a and 22.

The reflective plate 400 may be made of a resin material or a metallic material which has high reflexibility. The reflective plate 400 is located on the substrate 220 and is disposed on the side wall 120 of the case 100. The resin material may include, for example, a PET resin, a PC resin and a PVC resin and the like. The metallic material may include, for example, Ag or an alloy including Ag, Al or an alloy including Al, a stainless material and the like. The reflective plate 400 may include a bottom reflective plate 410, a side reflective plate 420 extending from the both sides of the bottom reflective plate 410 in such a manner as to be inclined outwardly at a predetermined angle with respect to the bottom reflective plate 410, and may further include a fixing protrusion 430 extending outward from the end of the side reflective plate 420.

An LED hole 411 is formed in the bottom reflective plate 410 of the reflective plate 400. A plurality of the LEDs 210 are inserted into the LED holes 411 and shown. Therefore, the LED holes 411 are formed corresponding to the number and position of the LEDs 210. The LED hole 411 may be formed by a punching process and also may be formed by various methods capable of forming a hole, such as an etching process and the like.

The side reflective plate 420 may be formed in a direction perpendicular to the bottom reflective plate 410 or, as shown in FIG. 22, may be inclined outward in the direction of the extension thereof. When inclined, the side reflective plate 420 may effectively reflect and emit the light generated from a plurality of the LEDs 210. That is, since the light from the LEDs is diffused as much as an orientation angle thereof, when the side reflective plate 420 is in a direction perpendicular to the bottom reflective plate 410, a part of the light emitted from the LEDs may be lost. On the contrary to this, when the side reflective plate 420 is formed to be inclined outwardly at a predetermined angle with respect to the bottom reflective plate 410, the light generated from the LEDs 210 may be effectively reflected and emitted to the outside.

Here, since the side reflective plate 420 is formed to be inclined outwardly at a predetermined angle with respect to the bottom reflective plate 410, the area of the bottom reflective plate 410 is smaller than the area of the bottom plate 110 of the case 100.

Since the thickness of the fixing protrusion 430 of the reflective plate 400 is less than the width of the diffuser plate coupling recess 180 of the case 100, the fixing protrusion 430 can be pushed in a sliding way into the diffuser plate coupling recess 180. Accordingly, the reflective plate 400 can be fixed to the case 100.

Figure 10B:
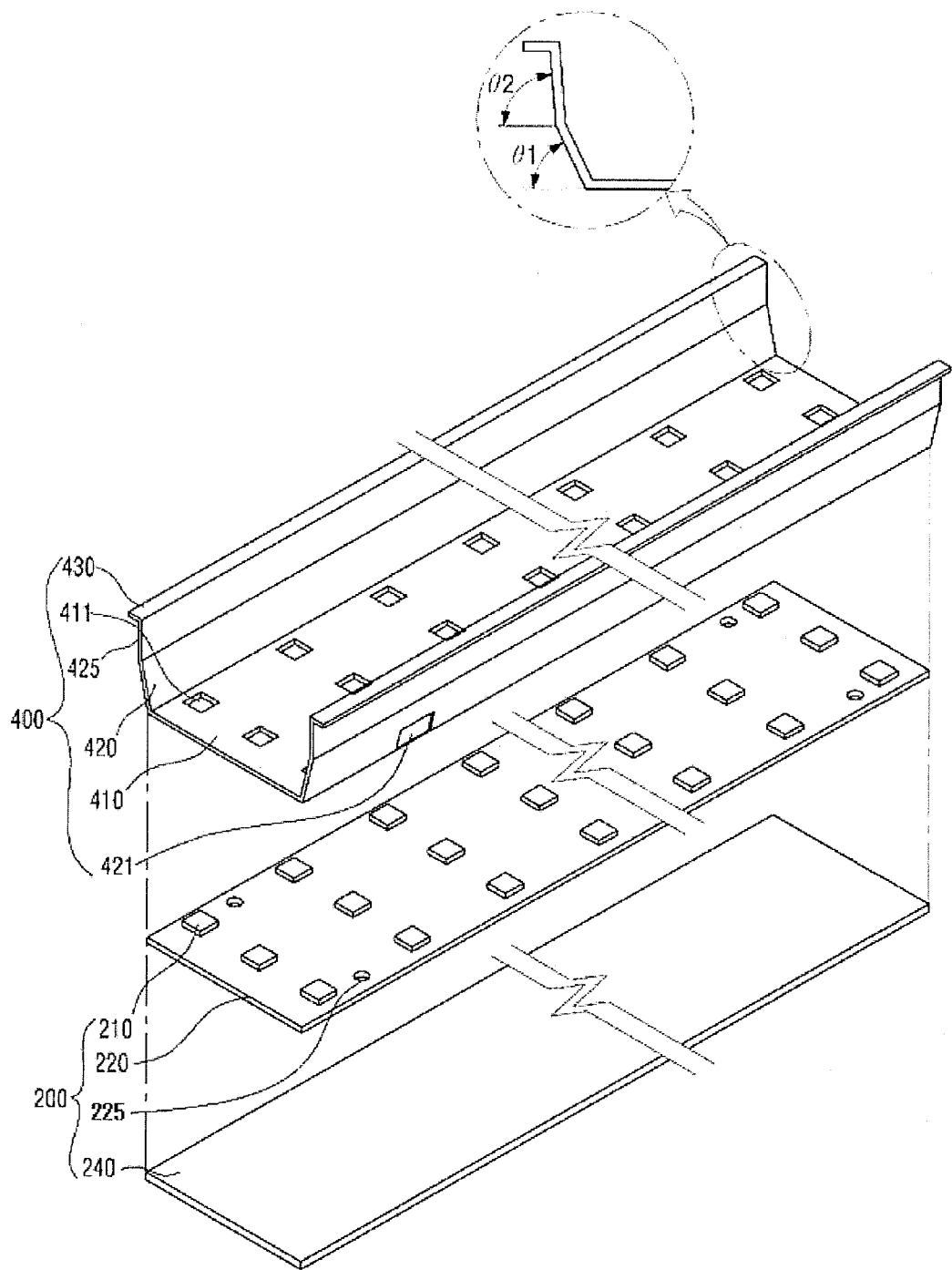

As shown in FIG. 10b, the reflective plate 400 may further include an auxiliary side reflective plate 425 extending from the side reflective plate 420. Here, an angle θ1 formed by the bottom reflective plate 410 and the side reflective plate 420 may be different from an angle θ2 formed by the bottom reflective plate 410 and the auxiliary side reflective plate 425. When the angles θ1 and θ2 are appropriately determined, the lighting device suitable for an installation point thereof can be provided.

When the reflective plate 400 includes the auxiliary side reflective plate 425, the reflective plate 400 may further include the fixing protrusion 430 extending outward from the end of the auxiliary side reflective plate 425. The fixing protrusion 430 can be pushed in the coupling recess 180 of the case 100.

The side reflective plate 420 may be formed extending from the bottom reflective plate 410 to the diffuser plate coupling recess 180 of the case 100. Meanwhile, as shown in FIG. 22, the side reflective plate 420 may extend to pass through the diffuser plate coupling recess 180 of the case 100 and even the side wall 120 of the case 100.

Referring to FIGS. 9 and 10a, a first electrical connection hole 421 may be formed in the lower part of the side reflective plate 420 of the reflective plate 400. The light emitter 200 is electrically connected to the power supply controller 20 through the first electrical connection hole 421, so that electric power is supplied to the light emitter 200. A second electrical connection hole (not shown) is formed at a location of the lower part of the side wall 120 of the case 100. The location corresponds to the location of the first electrical connection hole 421 of the reflective plate 400. Consequently, the light emitter 200 can be electrically connected to the power supply controller 20 through the first electrical connection hole 421 and the second electrical connection hole (not shown).

<Power Supply Controller 20>

Figure 23:
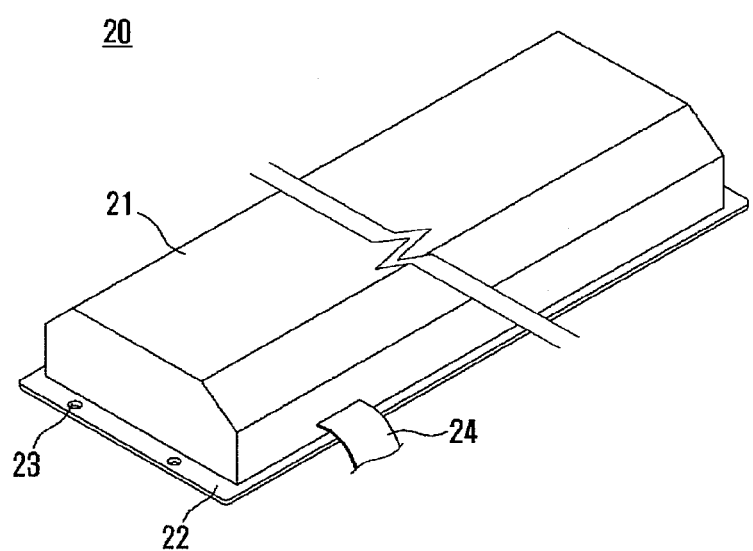
FIG. 23 is a perspective view of a power supply controller 20.
Figure 24:
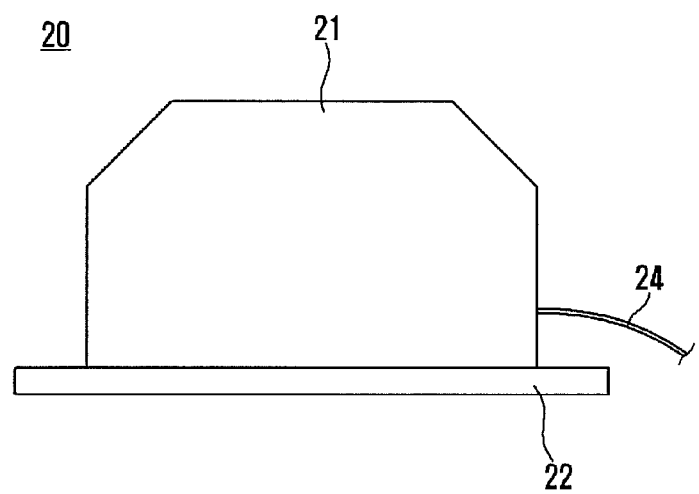
FIG. 24 is a front view of the power supply controller 20.

FIG. 23 is a perspective view of a power supply controller 20. FIG. 24 is a front view of a power supply controller 20.

Referring to FIGS. 23 and 24, the power supply controller 20 includes a body 21 and a second protrusion 22 formed in the lower end of the body 21. The body 21 may include a power supply unit (PSU, not shown) and a driving part (not shown) and the like. The driving part starts, operates and controls the light emitter 200. Since a sliding way by which the second projection 22 of the power supply controller 20 is coupled to the power supply controller coupling recess 152 of the case 100 has been already described, the description thereof will be omitted.

A third coupling hole 23 may be formed in the second projection 22. After the second projection 22 is inserted into the power supply controller coupling recess 152, a coupling screw or a pin and the like is inserted into the third coupling hole 23, so that the power supply controller 20 can be fixed to the case 100. But for the third coupling hole 23, the second projection 22 may be coupled to power supply controller coupling recess 152 by using an interference fit. The power supply controller 20 also includes a connection line 24. The connection line 24 allows the power supply controller 20 to be electrically connected to the light emitter 200. Therefore, the power supply controller 20 is able to supply electric power and a driving signal to the light emitter 200. The connection line 24 connects the light emitter 200 with the power supply controller 20 through the first electrical connection hole 421 and the second electrical connection hole (not shown). The power supply controller 20 may be formed of a material having a good heat radiating characteristic, such as a metallic material or a resin material.

Since various components such as the PSU and a driving part and the like are included in the body 21 of the power supply controller 20, it is possible to effectively protect the components from an external impact, moisture and the like. The power supply controller 20 is easily coupled to or separated from the case 100, thereby easily changing the power supply controller 20.

<Diffuser Plate 300>

Referring to FIGS. 1a to 3b and 5, the diffuser plate 300 is formed over the light emitter 200. The diffuser plate 300 allows light emitted from the LED 210 functioning as a point light source to be emitted through the diffuser plate 300. The surface of the diffuser plate 300 may actually function as a surface light source such that the emitted light obtains a uniform luminance.

Both sides of the diffuser plate 300 is inserted in a sliding way into the diffuser plate coupling recess 180 of the case 100 in the first direction "a" shown in FIG. 5, so that the diffuser plate 300 is coupled to the case 100. The material of the diffuser plate 300 may be, for example, a glass material, PMMA and PC and the like.

Since the diffuser plate 300 is arranged over the light emitter 200 instead of on the entire surface of the lighting device 1, the amount of the used diffuser plate 300 can be reduced. The width of the diffuser plate 300 is considerably less than the length thereof. Both sides of the diffuser plate 300 is supported in the longitudinal direction thereof by the case 100. Therefore, the diffuser plate 300 is insignificantly bent or drooped, so that there is no problem in commonly using the lighting device 1.

Figure 25:
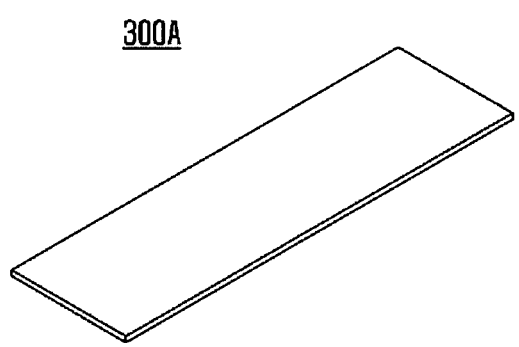
FIG. 25 is a perspective view showing an embodiment 300A of a diffuser plate 300.
Figure 26:
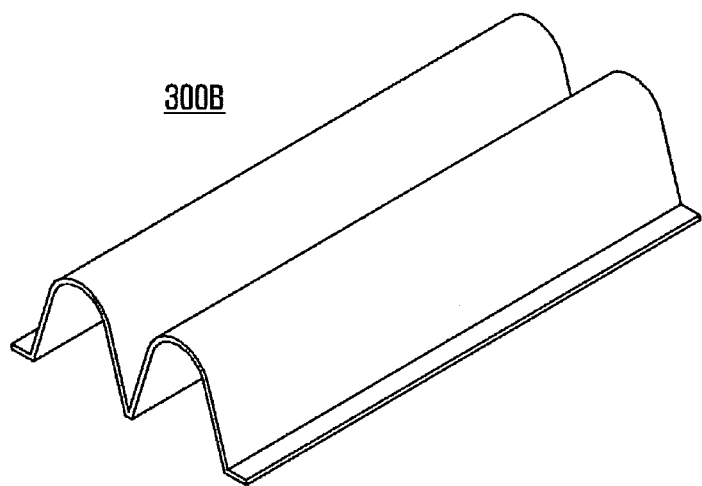
FIG. 26 is a perspective view showing another embodiment 300B of the diffuser plate 300.
Figure 27:
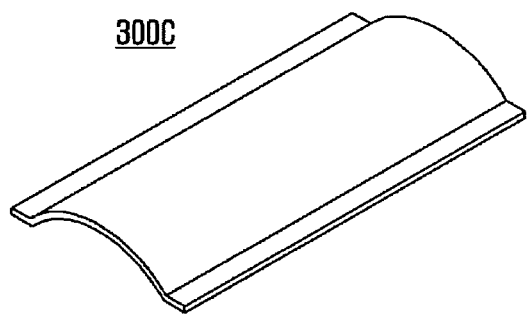
FIG. 27 is a perspective view showing further another embodiment 300C of the diffuser plate 300.
Figure 28:
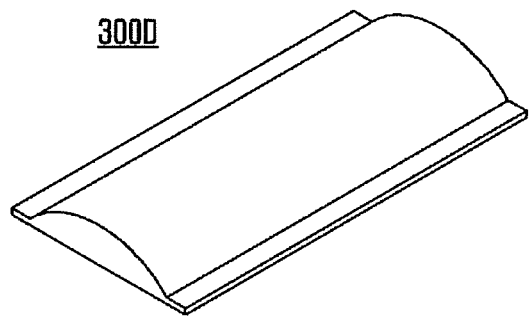
FIG. 28 is a perspective view showing still another embodiment 300D of the diffuser plate 300.

FIG. 25 is a view showing an embodiment 300A of a diffuser plate 300. FIG. 26 is a view showing another embodiment 300B of the diffuser plate 300, FIG. 27 is a view showing further another embodiment 300C of the diffuser plate 300. FIG. 28 is a perspective view showing still another embodiment 300D of the diffuser plate 300.

Referring to FIG. 25 to 28, the diffuser plate 300 may have various shapes for diversely controlling the light distribution of the emitted light of the light emitter 200. For example, in FIG. 25, the diffuser plate 300A may have a flat shape. In FIG. 26, the diffuser plate 300B may have a shape having two paraboloids which are convex in the traveling direction of the light emitted from the light emitter 200. In FIG. 27, the diffuser plate 300C may have a convex paraboloid which is convex in the traveling direction of the light emitted from the light emitter 200, and also may have a concave paraboloid. In FIG. 28, the light incident surface of the diffuser plate 300D is flat and the light emitting surface of the diffuser plate OOD is convex.

While the diffuser plate 300 may have a rectangular shape extending in the first direction "a", this is not necessarily required. It is often that the diffuser plate 300 usually has a flat shape. However, the diffuser plate 300 may have various shapes capable of controlling the light distribution of the light emitter 200.

The locking part 350 by which the projection 115 of the case 100 or the projection 415 of the reflective plate 400 is caught may be formed on the diffuser plates 300A, 300B, 300C and 300D. The variously shaped diffuser plates 300A, 300B, 300C and 300D including the locking part 350 formed thereon can be more simply coupled to the case 100 or the reflective plate 400 than the diffuser plates of FIGS. 1a, 2a and 3a.

<Side Cover 40>

Figure 29:
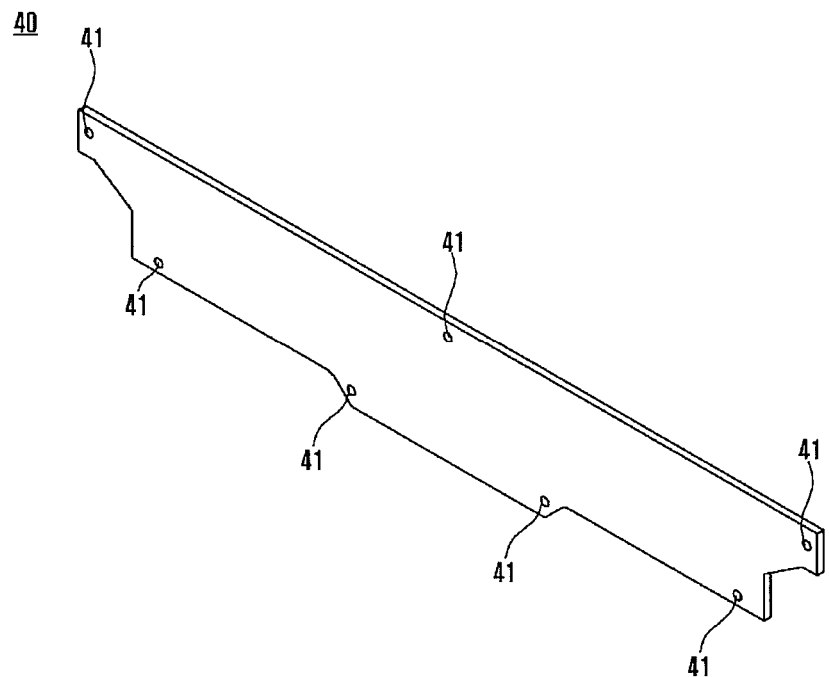
FIG. 29 is a perspective view of an embodiment of a side cover 40.
Figure 30:
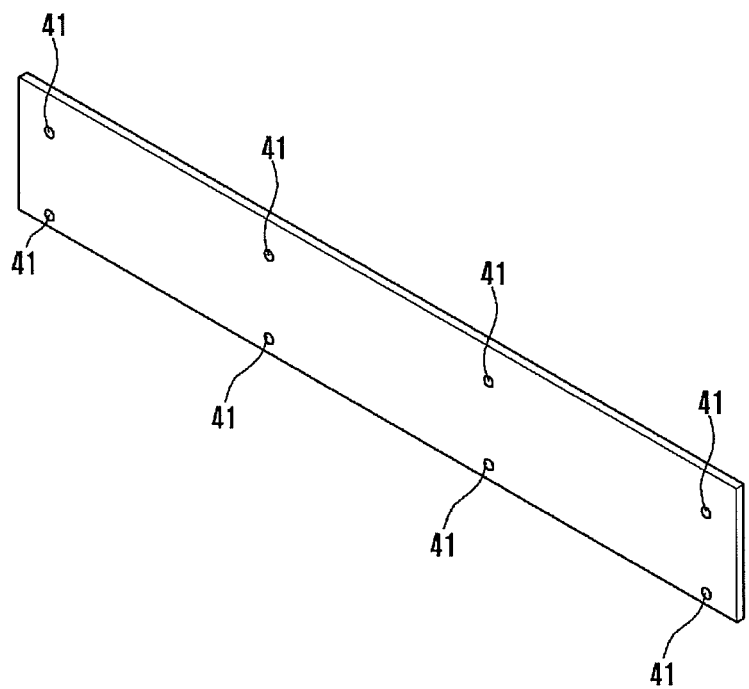
FIG. 30 is a perspective view of another embodiment of the side cover 40.

FIG. 29 is a view of an embodiment of a side cover 40. FIG. 30 is a view of another embodiment of the side cover 40.

Referring to FIGS. 4, 7, 13 and 19, at least one end of the case 100 may include the side cover 40. The side cover 40 may be formed on both ends of the case 100. The side cover 40 is able to prevent moisture and filth, etc., from penetrating into the case 100, to improve the rigidity of the lighting device and to fix the light emitter 200 and the power supply controller 20 which are received by the case 100. The side cover 40 may include a plurality of coupling holes 41. The case 100 may also include a plurality of side cover coupling recesses 154.

After the side cover coupling recess 154 of the case 100 and the coupling hole 41 of the side cover 40 are aligned with each other, the case 100 is coupled to the side cover 40 by allowing a screw or a pin to pass through the side cover coupling recess 154 and the coupling hole 41. The side cover 40 is able to prevent dust or filth from penetrating into the case 100 and to more improve the rigidity of the case 100. After a plurality of the coupling holes 41 are arranged such that a plurality of the side cover coupling recesses 154 can be seen, the side cover 40 is coupled to the case 100 by allowing a screw or a pin to pass through a plurality of the coupling holes 41 and a plurality of the side cover coupling recesses 154. The coupling hole 41 of the side cover 40 is not necessarily formed at a location corresponding to the location of the side cover coupling recess 154. The coupling hole 41 of the side cover 40 may be formed at a location corresponding to the first bracket coupler 151, the power supply controller coupling recess 152 and the second bracket coupler 153, which are formed in the case 100. In this case, more screws or pins are inserted into the first bracket coupler 151, the power supply controller coupling recess 152 and the second bracket coupler 153, so that the side cover 40 and the case 100 are coupled to each other.

Since the height and width of the side cover 40 may be formed to be equivalent to those of the case 100, the shape of the side cover 40 may be varied as shown in FIGS. 29 and 30. In addition, since the material of the side cover 40 may be the same as that of the case 100, the detailed description thereof will be omitted.

<Bracket 30>

Figure 31:
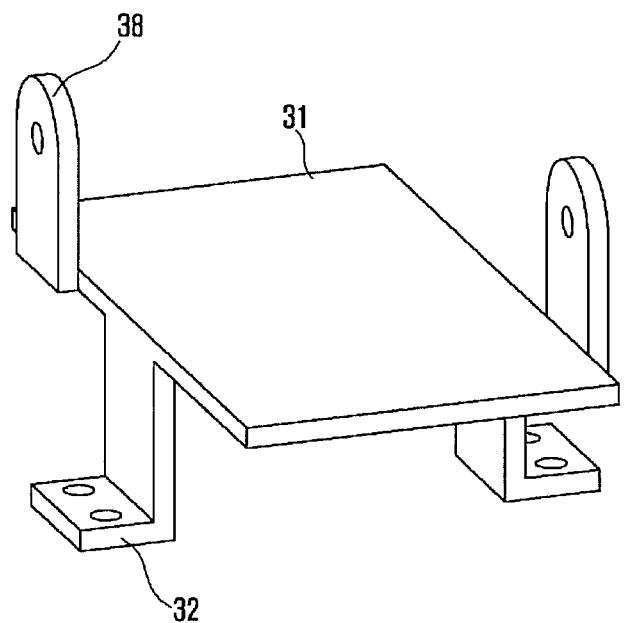
FIG. 31 is a perspective view showing an embodiment 30A of a bracket 30.
Figure 32:
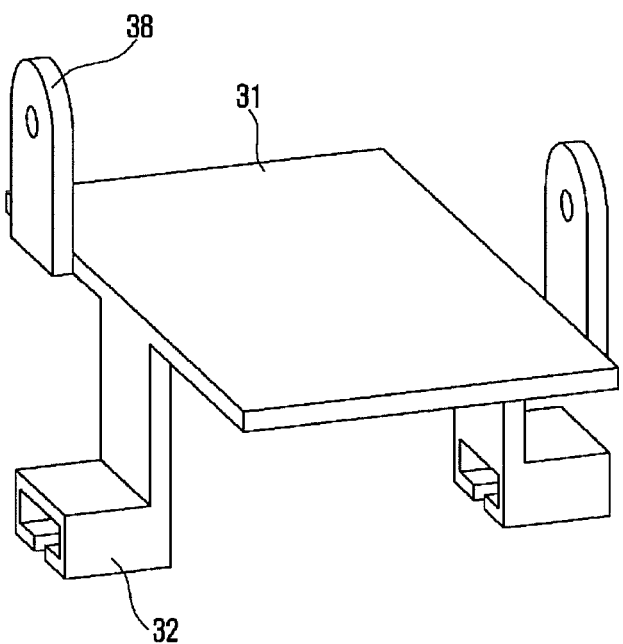
FIG. 32 is a perspective view showing another embodiment 30B of the bracket 30.
Figure 33:
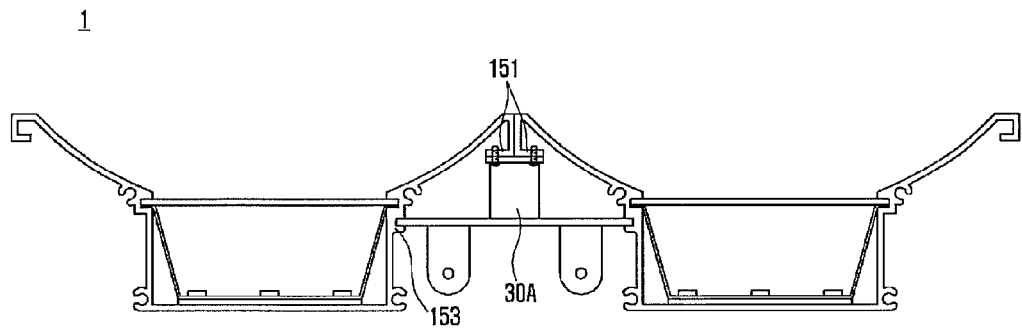
FIG. 33 is a cross sectional view of another embodiment of a lighting device including a single lighting module coupled thereto by using the bracket 30A.
Figure 34:
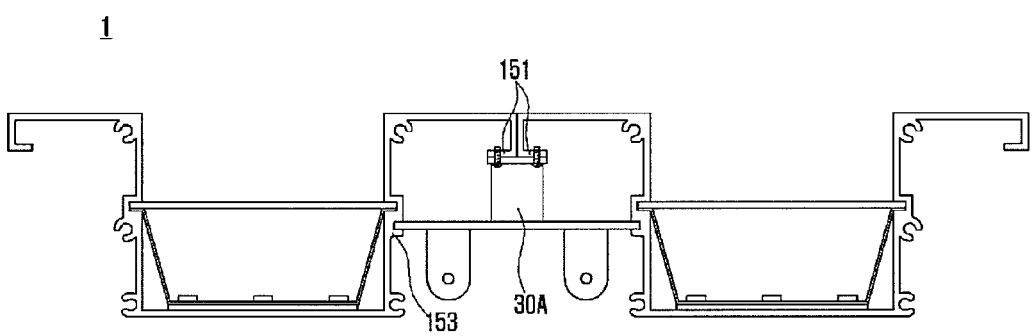
FIG. 34 is a cross sectional view of further another embodiment of a lighting device including a single lighting module coupled thereto by using the bracket 30A.
Figure 35:
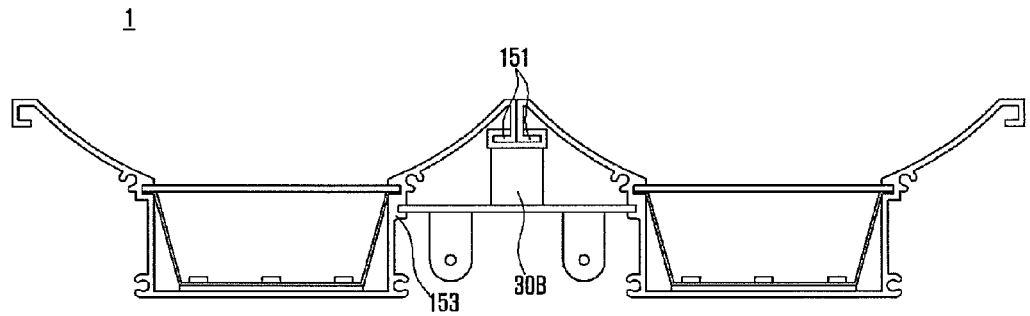
FIG. 35 is a cross sectional view of another embodiment of a lighting device including a single lighting module coupled thereto by using the bracket 30B.
Figure 36:
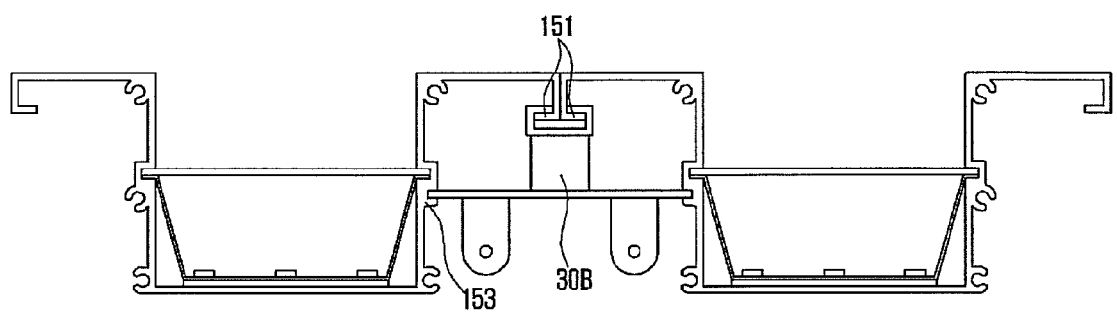
FIG. 36 is a cross sectional view of further another embodiment of a lighting device including a single lighting module coupled thereto by using the bracket 30B.

FIG. 31 is a perspective view showing an embodiment 30A of a bracket 30. FIG. 32 is a perspective view showing another embodiment 30B of the bracket 30. FIG. 33 is a cross sectional view of another embodiment of a lighting device including a single lighting module coupled thereto by using the bracket 30A. FIG. 34 is a cross sectional view of further another embodiment of a lighting device including a single lighting module coupled thereto by using the bracket 30A. FIG. 35 is a cross sectional view of another embodiment of a lighting device including a single lighting module coupled thereto by using the bracket 30B. FIG. 36 is a cross sectional view of further another embodiment of a lighting device including a single lighting module coupled thereto by using the bracket 30B.

Referring to FIGS. 31 and 32, the brackets 30A and 30B include a fixed plate 31, a lighting module coupling member 32 which extends from one end of the fixed plate 30 and is coupled to the first bracket coupler 151 of the case 100, and a safety ring 38 extending from one end of the fixed plate 30. The lighting module coupling member 32 and/or the safety ring 38 may be formed not only at one end of the fixed plate 30, but at the other end of the fixed plate 30.

Referring to FIGS. 6 and 11a, it can be seen that how the case 100 is coupled to the bracket 30 in the first embodiment and that how the case 100 is coupled to the bracket 30 in the second embodiment. The fixed plate 30 is pushed in a sliding way into the second bracket coupler 153 of the case 100. As the lighting module coupling member 32 has a through hole, the lighting module coupling member 32 is coupled to the first bracket coupler 151 of the case 100 by allowing a screw or a pin to pass through the through hole.

Referring to FIGS. 33 and 34, the first bracket coupler 151 of the case 100 has a shape different from that of FIGS. 6 and 11a. However, a method by which the case 100 is coupled to the bracket 30 is the same as that of FIGS. 6 and 11. That is, the fixed plate 30 is pushed in a sliding way into the second bracket coupler 153 of the case 100. As the lighting module coupling member 32 has a through hole, the lighting module coupling member 32 is coupled to the first bracket coupler 151 of the case 100 by allowing a screw or a pin to pass through the through hole.

Referring to FIGS. 35 and 36, as compared with the bracket 30A shown in FIGS. 33 and 34, the bracket 30B also includes the fixed plate 30 and the safety ring 38. However, the shape of the lighting module coupling member 32 and a method by which the lighting module coupling member 32 is coupled to the first bracket coupler 151 of the case 100 are different from those of FIGS. 33 and 34. The lighting module coupling member 32 does not include a through hole through which a screw or a pin passes. Instead, the lighting module coupling member 32 has a shape capable of hanging over and being fixed to the first bracket coupler 151. The first bracket coupler 151 used in this case has a shape different from that of the first bracket coupler 151 shown in FIGS. 6, 11a, 33 and 34. Unlike the bracket 30A shown in FIGS. 31, 33 and 34, the bracket 30B shown in FIGS. 32, 35 and 36 can be coupled in a sliding way to the first bracket coupler without a screw or a pin.

The first bracket coupler 151 is formed at one end of the louver 130 of the case 100. The second bracket coupler 153 is formed in the louver 130 or in the side wall 120. Meanwhile, when the top plate 140 is provided instead of the louver 130, like the second embodiment shown in FIGS. 11a and 12a, the first bracket coupler 151 is formed at one end of the top plate 140 of the case 100, and second bracket coupler 153 is formed in the side wall 120.

The safety ring 38 prevents the provided lighting device 1 from being separated from the provided position or being damaged by falling down to the ground due to earthquake or other impacts, or prevents a person who is under the lighting device 1 from being hurt. A rope passing through the safety ring 38 is fixed within the ceiling. In this case, even though the lighting device 1 is separated from its provided position by impact, the rope fixed within the ceiling holds the safety ring 38 and prevents the lighting device 1 from falling down to the bottom surface. Therefore, the bracket 30 having the safety ring 38 includes not only an original function of connecting the single lighting modules, but an additional function of obtaining safety.

It is not necessary that only one bracket 30 is coupled to the case 100 in the longitudinal direction of the case 100. A plurality of the brackets 30 may be coupled to the case 100 so as to improve the coupling rigidity between the single lighting modules or so as to obtain safety.

Figure 37:
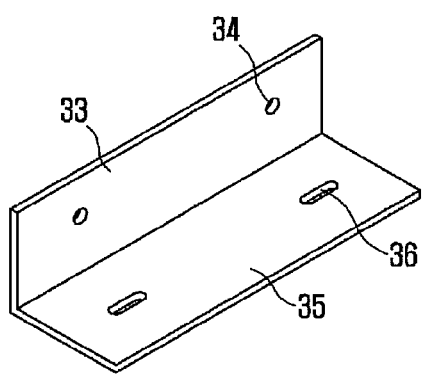
FIG. 37 is a perspective view of further another embodiment 30C of the bracket 30.
Figure 38:
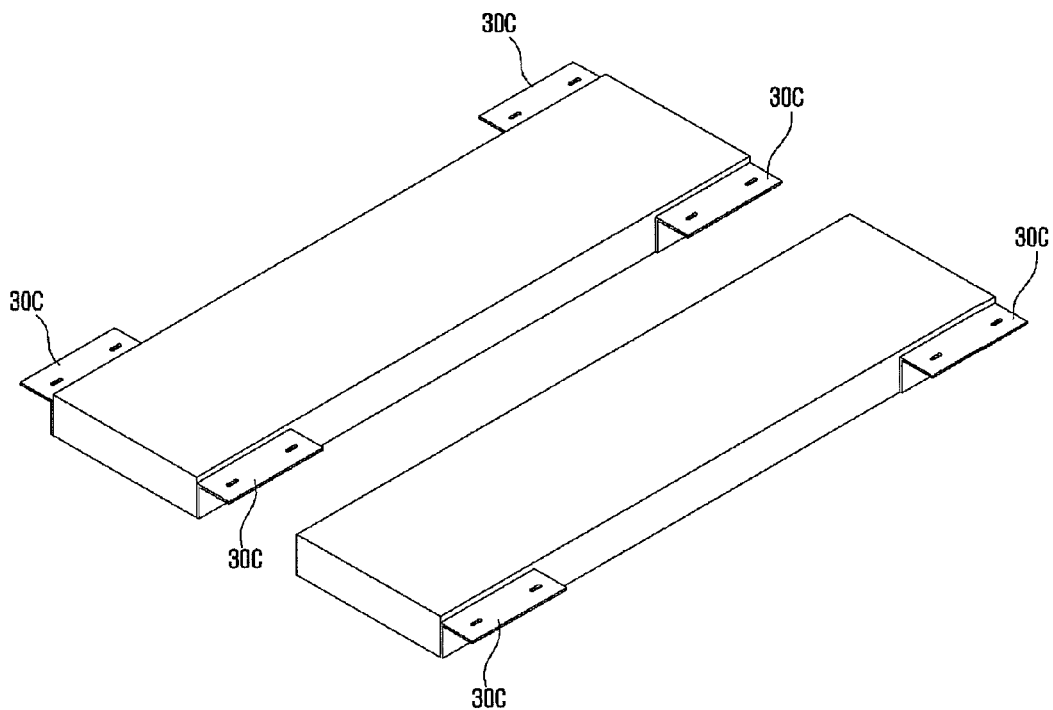
FIG. 38 is a perspective view shows a structure in which the bracket 30C interconnects the single lighting modules 10.

FIG. 37 is a view of further another embodiment 30C of the bracket 30. FIG. 38 is a view shows a structure in which the bracket 30C interconnects the single lighting modules 10.

Referring to FIG. 38, a plurality of the brackets 30C may be arranged on the lighting device 1, that is, the outer lateral surface of the case 100. The bracket 30C having such a shape is used to interconnect the cases 100 having no separate first bracket coupler 151, like the case 100 shown in FIGS. 17 and 18 or the case 100 shown in FIG. 38. The bracket 30C includes two planes which are in contact with each other at a right angle. The two planes include a first plane 33 coupled to the outer lateral surface of the case 100, and a second plane 35 coupled to an outer support member such as a ceiling or a wall surface, etc., or to the outer lateral surface of the case 100. The first plane 33 includes a first coupling hole 34. The second plane 35 includes a second coupling hole 36. The single lighting modules are interconnected by inserting a coupling screw, etc., into the first and the second coupling holes 34 and 36. Also, the lighting device 1 may be coupled to an outer support member by inserting a coupling screw, etc., into the first and the second coupling holes 34 and 36. The bracket 30C may be integrally formed with the case 100.

<Support Frame 50>

Figure 42:
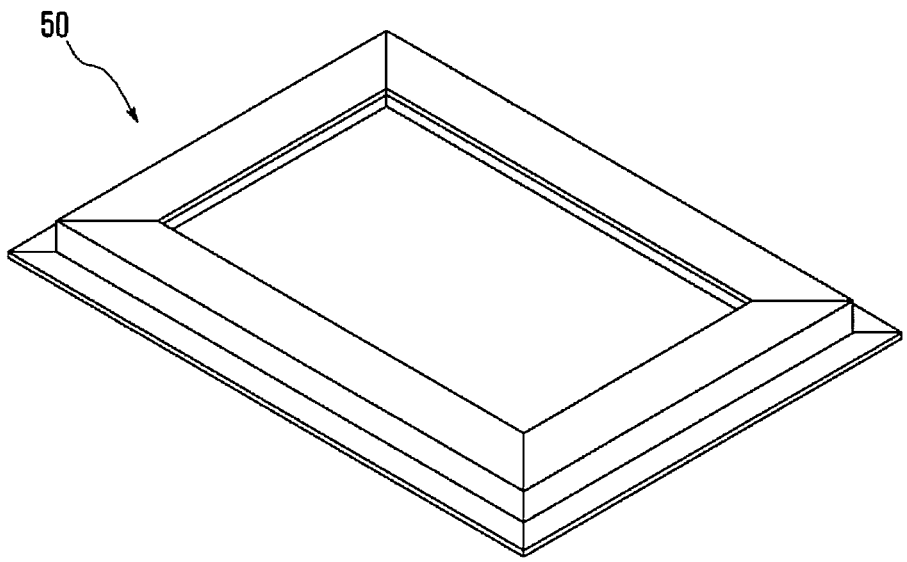
FIG. 42 is a perspective view of a support frame 50.
Figure 44:
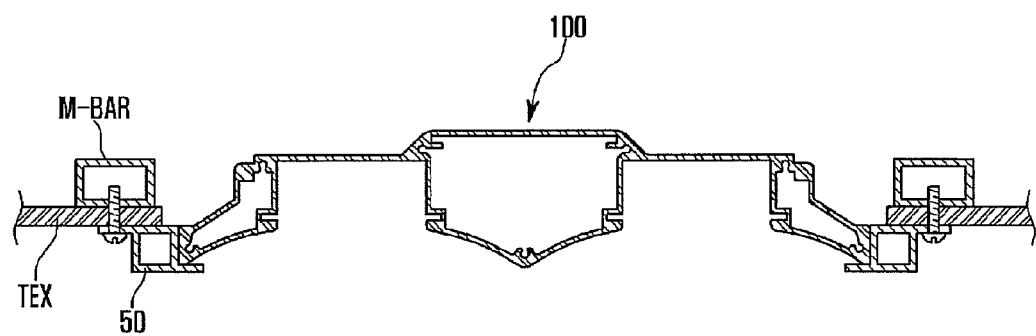
FIG. 44 is a cross sectional view showing how the support frame 50 is coupled to an M-BAR of a ceiling.
Figure 45:
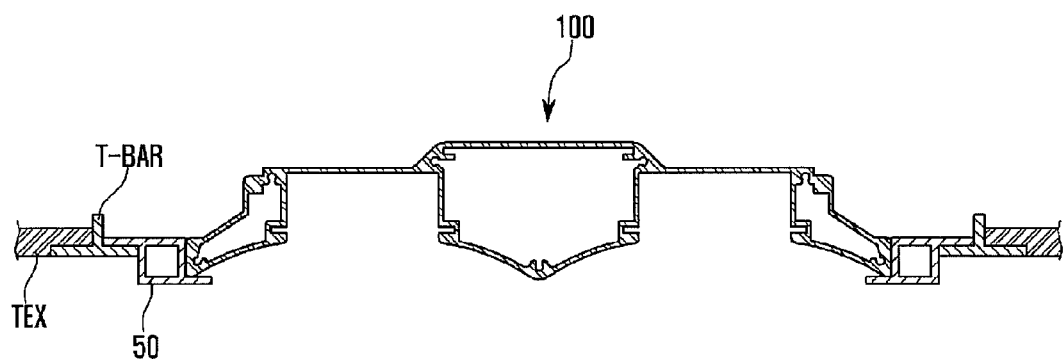
FIG. 45 is a cross sectional view showing how the support frame 50 is coupled to a T-BAR of a ceiling.

FIG. 42 is a perspective view of a support frame 50. FIG. 42 is a cross sectional view of the support frame 50. FIG. 44 is a cross sectional view showing how the support frame 50 is coupled to an M-BAR of a ceiling. FIG. 45 is a cross sectional view showing how the support frame 50 is coupled to a T-BAR of a ceiling.

Figure 43:
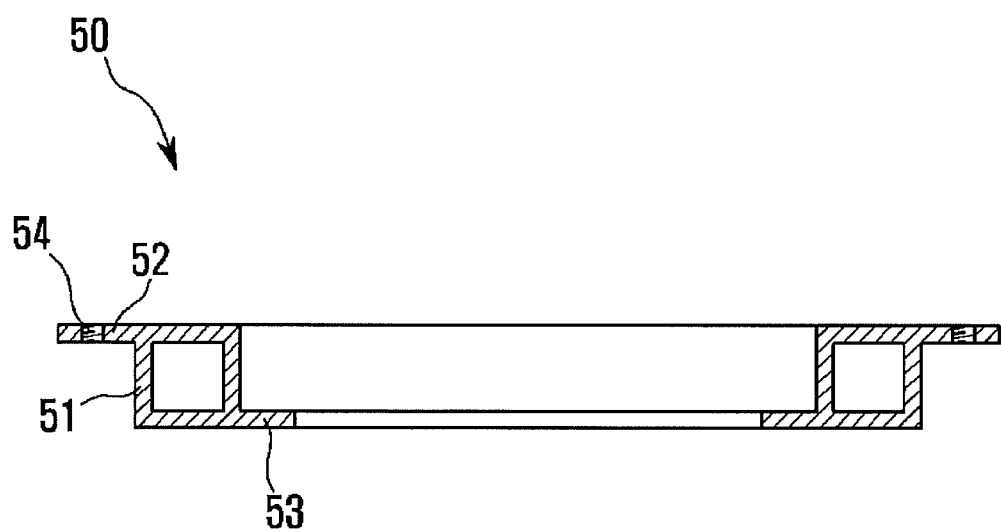

Referring to FIG. 42 to 45, a support frame 50 includes a frame body 51 surrounding the outer lateral surface of the case 100, a case support 53 extending from the inner lateral surface of the frame body 51 and supporting the weight of the case 100, a ceiling fixed part 52 extending from the outer lateral surface of the frame body 51 and being fixed to the ceiling. As shown in FIG. 43, the frame body 51 may have an inner empty space in order to reduce its weight.

The case support 53 comes in contact with the end of the louver 130 of the case 100 and supports the weight of a member including the case 100 and forming a lighting device. A distance between the case supports 53 located at a position corresponding to the side cover 40 may be somewhat shorter than a distance between the outermost louvers 130 of the lighting device so as to prevent the members of the lighting device other than the support frame 50 from dropping through an opening of the support frame 50. If the distance between the between the case supports 53 is shorter than necessary, the inclined plane of the louver 130 may be hidden. This is not preferable. Therefore, the distance between the case supports 53 may be formed in such a manner that the inclined plane of the louver 130 is not hidden.

The ceiling fixed part 52 fixes the lighting device to the ceiling. Moreover, if there is a space between the case 100 and the ceiling on which the case 100 is installed, the ceiling fixed part 52 hides the space and allows the lighting device to have a beautiful appearance. The ceiling fixed part 52 may have a ceiling coupling recess 54.

Referring to FIGS. 43 and 44, the lighting device may be fixed to the ceiling by allowing a screw to pass through the ceiling coupling recess 54, TEX and an M-BAR.

Referring to FIGS. 43 and 45, due to the weight of the lighting device itself, the lower surface of the ceiling fixed part 52 contacts with T-BAR. Under this condition, the lighting device is fixed to the ceiling. In this case, the ceiling fixed part 52 does not necessarily include the ceiling coupling recess 54. However, considering that the lighting device is installed in the M-BAR as well as the T-BAR, the ceiling fixed part 52 may include the ceiling coupling recess 54.

In particular, the support frame 50 can be flexibly used for various installation environments. The area of a ceiling on which lighting devices are installed are changed according to countries or a ceiling structure. In the embodiments described above, a lighting device having various sizes is created through combination of the single lighting modules 10. However, if the lighting device fixed to the ceiling has an empty space formed between the ceiling and the lighting device, the lighting device has a bad appearance and is unstably fixed. In this case, if several tens of to hundreds of the standards of the single lighting module 10 are provided to overcome the problems in order to be securely fixed and to obtain a beautiful appearance, there occur problems, for example, an increase of a manufacturing cost, and the like. Therefore, as described in the aforementioned embodiments, when the several single lighting modules 10 having a predetermined size are used, and when the support frame 50 having various sizes is applied with respect to the empty space between the lighting device and the ceiling, the lighting device is able to have a beautiful appearance and be stably fixed. A member used to form the support frame 50 extends in a longitudinal direction thereof. The cross section formed by cutting the member in a direction parallel with the longitudinal direction thereof has a uniform shape. When a rectangular shape is formed by dividing the member into four pieces and connecting the edges of the pieces, the support frame 50 having a necessary size can be obtained. Accordingly, it is possible to cause the production process of the support frame 50 to be very simple and to allow the support frame 50 to be used for various ceilings. Particularly, if the member has a fixed standard except the length of the ceiling fixed part 52, the support frame 50 can be almost completely used for various ceilings.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A lighting device comprising:
   a light emitter that includes a plurality of light emitting diodes (LEDs);
   a reflective plate disposed on the light emitter;
   a diffuser plate disposed in a direction in which light emitted from the LED is irradiated;
   a case that includes the light emitter disposed therein and that includes a bottom plate and a side wall extending from both side ends of the bottom plate; and
   a connecting member that extends from the side wall of the case and that includes a bracket coupler on at least one side of the connecting member,
   wherein the light emitter is disposed between the bottom plate of the case and the diffuser plate,
   wherein the side wall of the case has an upper portion and a lower portion, and the lower portion is coupled to the bottom plate,
   wherein the diffuser plate is coupled to the upper portion of the side wall, and
   wherein the bracket coupler of the connecting member is disposed higher than a top surface of the diffuser plate.

2. The lighting device of claim 1, further comprising a heat radiator contacting with the light emitter.

3. The lighting device of claim 2, wherein the heat radiator comprises at least one of a heat radiating fin or a heat radiating sheet.

4. The lighting device of claim 1, wherein the light emitter is disposed closer to the diffuser plate than to the bottom plate of the case.

5. The lighting device of claim 1, wherein the connection member further includes a louver or a top plate, and wherein the bracket coupler is disposed at an end of the louver or the top plate.

6. The lighting device of claim 5, wherein the louver or the top plate is inclined more outward from the case than the side wall.

7. The lighting device of claim 1, wherein the side wall of the case comprises a first side wall and a second side wall opposite to the first side wall, wherein the connection member comprises a first connector that extends from the first side wall and a second connector that extends from the second side will, and wherein at least one of the first connector or the second connector comprises the bracket coupler.

8. The lighting device of claim 1, wherein the diffuser plate comprises at least one paraboloid that is convex in a traveling direction of the light emitted from the light emitter.

9. The lighting device of claim 1, wherein the diffuser plate comprises a flat surface on which the light emitted from the light emitter is incident and a convex surface through which the light emitted from the light emitter is emitted.

10. The lighting device of claim 1, wherein the reflective plate comprises a bottom reflective plate and a side reflective plate extending from the bottom reflective plate and having an inclination.

11. The lighting device of claim 10, wherein the reflective plate further comprises a fixing protrusion extending from the side reflective plate, and wherein the case further comprises a coupling recess coupled to the fixing protrusion.

12. The lighting device of claim 10, wherein the side reflective plate of the reflective plate has a first inclination, wherein the reflective plate further comprises an auxiliary reflective plate extending from the side reflective plate and having a second inclination, and wherein the first inclination is different from the second inclination.

13. The lighting device of claim 12, wherein the reflective plate further comprises a fixing protrusion extending from the auxiliary reflective plate, and wherein the case further comprises a coupling recess coupled to the fixing protrusion.

14. A lighting device comprising:
    a light emitter that includes a plurality of light emitting diodes (LEDs);
    a reflective plate being disposed on the light emitter and that includes a bottom reflective plate and a side reflective plate that extends from the bottom reflective plate and has an inclination;
    a diffuser plate disposed in a direction in which light emitted from the LED is irradiated;
    a case that includes the light emitter disposed therein and that includes a bottom plate and a side wall extending from the bottom plate; and
    a connecting member that extends from the side wall of the case and that includes a bracket coupler on at least one side of the connecting member,
    wherein the side wall of the case has an upper portion and a lower portion,
    wherein the side reflective plate has an upper portion and a lower portion,
    wherein the diffuser plate is coupled to either the upper portion of the side wall of the case or the upper portion of the side reflective plate, and
    wherein the bracket coupler is provided higher than the diffuser plate.

15. The lighting device of claim 14, wherein the diffuser plate comprises a locking part, and wherein at least one of the reflective plate or the case comprises a fastener coupled to the locking part.

16. The lighting device of claim 14, wherein the diffuser plate comprises a locking part, and wherein at least one of the reflective plate or the case comprises a fastener coupled to the locking part.

17. The lighting device of claim 14, wherein the diffuser plate comprises a locking part, and wherein the case comprises a fastener coupled to the locking part.

18. The lighting device of claim 17, wherein the reflective plate comprises the fastener, wherein the case further comprises a coupling recess into which an end of the reflective plate is inserted, and wherein the fastener of the reflective plate is disposed closer to the light emitter than the end of the reflective plate.

19. The lighting device of claim 14, wherein the locking part of the diffuser plate comprises at least one of a locking projection or a locking hole.

20. A lighting device comprising:
    a light emitter that includes a plurality of light emitting diodes (LEDs);
    a reflective plate disposed on the light emitter;
    a diffuser plate being disposed in a direction in which light emitted from the LED is irradiated and that includes a locking hole;
    a case that includes the light emitter disposed therein and that includes a bottom plate and a side wall extending from side ends of the bottom plate; and
    a connecting member that extends from the side wall of the case and that includes a bracket coupler on at least one side end of the connecting member,
    wherein at least one of the reflective plate or the case includes a fastener having a protrusion coupled to the locking hole of the diffuser plate,
    wherein the bracket coupler is provided higher than the diffuser plate.

* * * * *